US008552327B2

(12) United States Patent
Pippin

(10) Patent No.: US 8,552,327 B2
(45) Date of Patent: Oct. 8, 2013

(54) SINGLE PASS MAIL SORTING SYSTEM

(75) Inventor: James M. Pippin, Keller, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 782 days.

(21) Appl. No.: 11/487,178

(22) Filed: Jul. 14, 2006

(65) Prior Publication Data

US 2007/0017855 A1 Jan. 25, 2007

Related U.S. Application Data

(60) Provisional application No. 60/699,058, filed on Jul. 14, 2005.

(51) Int. Cl.
*G06K 9/00* (2006.01)

(52) U.S. Cl.
USPC ............................ 209/584; 209/583; 209/900

(58) Field of Classification Search
USPC ................... 209/583, 584, 900; 700/223–227
See application file for complete search history.

(56) References Cited

U.S. PATENT DOCUMENTS

| | | | | | |
|---|---|---|---|---|---|
| 5,588,520 | A * | 12/1996 | Affaticati et al. | ........ | 198/370.06 |
| 5,983,594 | A * | 11/1999 | Forman | ........ | 53/133.5 |
| 6,385,946 | B1 * | 5/2002 | Singh | ........ | 53/429 |
| 6,547,078 | B1 * | 4/2003 | Lile et al. | ........ | 209/539 |
| 6,924,451 | B2 * | 8/2005 | Hanson | ........ | 209/584 |
| 2002/0125177 | A1 * | 9/2002 | Burns et al. | ........ | 209/630 |
| 2003/0029141 | A1 * | 2/2003 | Townsend | ........ | 53/459 |
| 2003/0038065 | A1 * | 2/2003 | Pippin et al. | ........ | 209/584 |
| 2003/0155282 | A1 * | 8/2003 | Kechel | ........ | 209/584 |
| 2006/0016738 | A1 * | 1/2006 | Norris et al. | ........ | 209/584 |
| 2006/0180521 | A1 * | 8/2006 | Edmonds | ........ | 209/584 |

* cited by examiner

*Primary Examiner* — Joseph C Rodriguez
*Assistant Examiner* — Kalyanavenka Teshware Kumar

(57) ABSTRACT

A method of mail sorting according to the invention includes the steps of sorting a batch of mail addressed to recipients in a common postal delivery zone with an automated single pass mail sorting machine into groups wherein the mail pieces in each group have a common delivery destination, transporting the groups of sorted mail using an automated conveying system to a delivery point packaging machine, and then packaging the groups of mail pieces with the delivery point packaging machine. Such a method is preferably part of a single pass sorting process wherein a batch of starting mail destined to a common zone is sorted into groups of mail for each destination that are then brought to the delivery point packaging machine in carrier delivery order.

13 Claims, 20 Drawing Sheets

200

SINGLE PASS MAIL SORTING SYSTEM

This application claims priority of U.S. Provisional Patent Application Ser. No. 60/699,058, filed Jul. 14, 2005.

TECHNICAL FIELD

This invention relates to postal sorting machines, methods and systems.

BACKGROUND OF THE INVENTION

Single pass sorting of letter mail to carrier delivery order has long been a goal of postal automation. However, due to the difficulty of developing such a system in a form that is feasible in size, speed and cost, no practical single pass sorting system has yet been developed. Edmonds U.S. Patent Application 20030208298, Nov. 6, 2003, describes a method and system for single pass letter and flat processing including an induction and scanning system, a single pass sorting and packaging system for automatically sorting and packaging a plurality of mail pieces based on a single scan by the induction and sorting system, and a control unit connected to and controlling the induction and scanning system and the single pass sorting and packaging system. However, the disclosure of the Edmonds patent application is predominantly schematic in nature and does not provide a system for single pass sorting as proposed. Hanson U.S. Patent Application 20040065595, Apr. 8, 2004 to a single pass sequencer is likewise at a high level of generality, leaving the task of designing mechanical systems to accomplish the hoped-for results undescribed.

Pippin et al. U.S. Patent Application 20030038065, published Feb. 27, 2003 (the '065 application, now U.S. Pat. No. 7,138,596) and U.S. Patent Application 20020031284, Mar. 14, 2002 (now U.S. Pat. No. 6,715,614), the entire contents of which are incorporated herein by reference, describe an automated single pass mail sorting system wherein individual mail pieces are delivered and inserted into to slots by robotic delivery units. To accomplish this, the delivery units make use of H-belt inserters which are capable of inserting mail into a pocket in a vertical position, even where the pocket already contains some previously sorted mail. The pockets may contain bags such that each postal patron's mail is sorted into a bag at the end of a sorting run, and the bags as arranged on the sorting case are in delivery order.

The present invention provides a number of improvements to the sorting system of the foregoing Pippin et al. applications. First, instead of sorting directly to bags placed in the slots, a delivery point packaging machine is used to wrap the mail after sorting is concluded. For this purpose, the mail must be removed from the slots after sorting and transported to a wrapping station. This could be accomplished manually, but is preferably done by sorting the mail to a series of multi-slot pods mounting on the sorting case, and then removing the pods for extraction of the mail as described hereafter.

Commonly-owned Pippin et al. U.S. patent application Ser. No. 11/128,494, filed May 13, 2005 (now U.S. Pat. No. 7,426,996), the entire contents of which are incorporated by reference herein, describes a delivery point package for mail in the form of a folder that partially encloses the mail and has a pair of releasable contact adhesive stripes that allow the sides of the folder to cling to the outermost mail pieces on either side. This is a very desirable form of package that uses less packaging material than bags or polywrapping. The present invention addresses the problem of applying such a package as part of an automated single pass sorting process.

SUMMARY OF THE INVENTION

A method of mail sorting according to the invention includes the steps of sorting a batch of mail addressed to recipients in a common postal delivery zone with an automated single pass mail sorting machine into groups wherein the mail pieces in each group have a common delivery destination, transporting the groups of sorted mail using an automated conveying system to a delivery point packaging machine, and then packaging the groups of mail pieces with the delivery point packaging machine. Such a method is preferably part of a single pass sorting process wherein a batch of starting mail destined to a common zone is sorted into groups of mail for each destination that are then brought to the delivery point packaging machine in carrier delivery order.

According to another aspect of the invention, a method is provided for sorting mail to a case having a plurality of slots, wherein each slot corresponds to a destination. Such a method includes steps of:

(a) loading a mail piece to be sorted into a delivery robot;

(b) determining for the mail piece a destination slot the mail piece is to be delivered to;

(c) moving the delivery robot along a rail disposed at the front of the case near the slots into proximity with an open end of the destination slot;

(d) inserting the mail piece from the delivery robot into the associated slot; and (e) returning the delivery robot to a loading station whereby steps (a)-(d) may be repeated until sorting is completed;

(f) then unloading the mail pieces from the slots; and (g) separately packaging each batch of mail pieces removed from the slots.

The delivery robots preferably move along a rail mounted adjacent a horizontal row of upright slots that receive mail pieces from the delivery robot through an open front side thereof.

The invention further provides an apparatus for packaging a group of flat items disposed side by side, which apparatus is suitable for use as a delivery point packaging machine. The apparatus includes a roll of a packaging sheet material mounted for rotation about its lengthwise axis, a pair of vacuum rollers rotatably mounted in spaced positions such that a free end of the sheet on the roll may be unwound and extend over a perforate circumferential surface each of the vacuum rollers, a drive system that drives at least one of the vacuum rollers towards the other in a manner effective to form a well in a free end of the sheet held to respective perforate circumferential surfaces of each of the vacuum rollers, and a cutter positioned between the roll and the vacuum rollers to sever a free end portion of the sheet. A printer may be provided to print destination information, carrier alerts and other information such as advertising on each sheet prior to applying the sheet to a batch of mail. These and other aspects of the invention are discussed further in the detailed description that follows.

BRIEF DESCRIPTION OF THE DRAWING

In the accompanying drawing, like numerals denote like elements, and.

DETAILED DESCRIPTION

Figure 1:
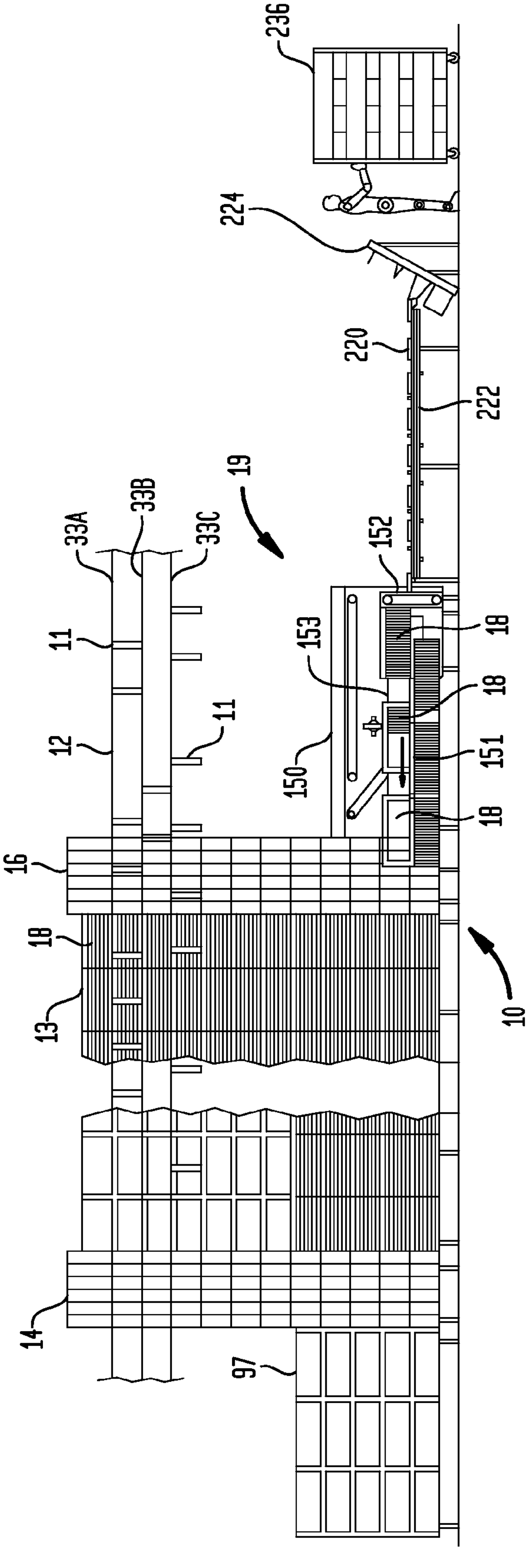
FIG. 1 is a schematic side view of a single-pass sorting system according to the invention.

An improved single-pass sorting system 10 according to the invention operates as described the '065 application, incorporated by reference above, with the differences noted herein. As shown in FIG. 1, inserter delivery robots 11 (referred to as robots 100 in the '065 application) move along a rail system 12 during sorting, delivering mail pieces to destination slots and inserting them therein. The delivery slots are provided by a number of pods 18, each housing a row of pockets 15, which are inserted into one or more upright cases or towers 13. For each tower 13, divert and merge elevators 14, 16 are provided for transporting a delivery robot 11 vertically between rail levels. Mail pieces are loaded into robots 11 at a feeding section 21, and are unloaded from pods 18 at an unloading or extraction section 19 as described hereafter.

Figure 2:
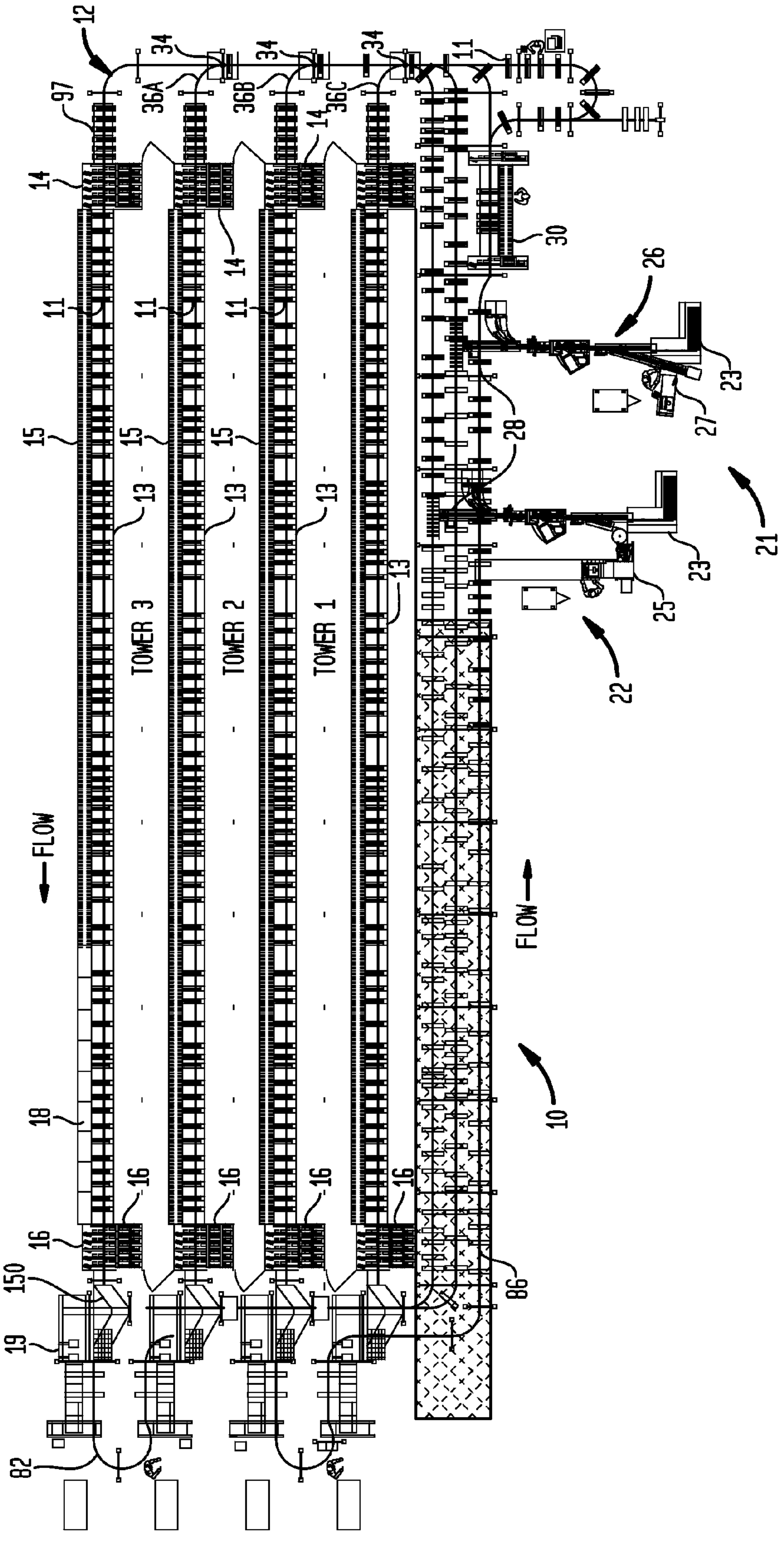
FIG. 2 is a schematic top (plan) view of the system of FIG. 1.
Figure 3:
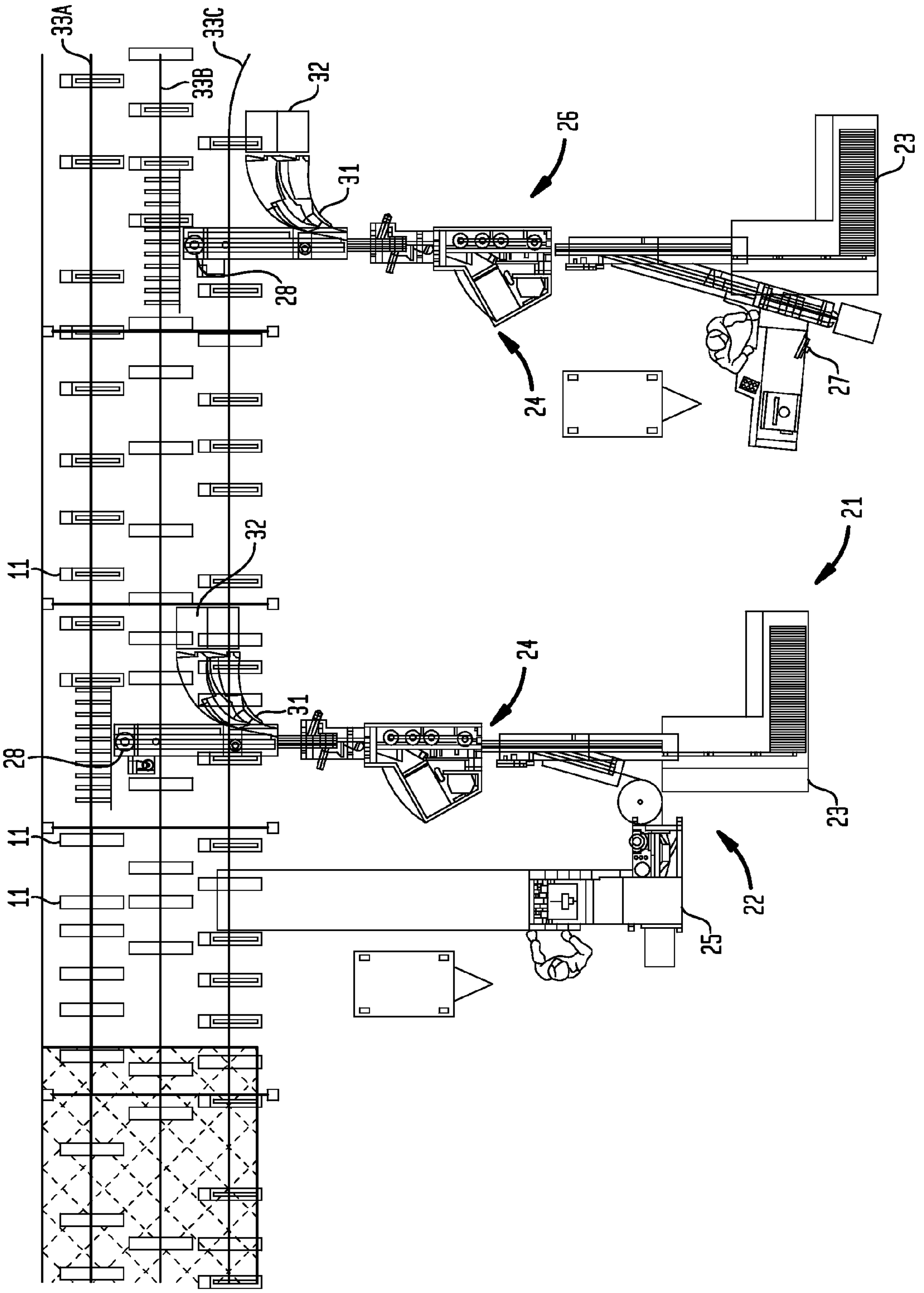
FIG. 3 is an enlarged view of the feeding section of the system shown in FIG. 2.
Figure 4:
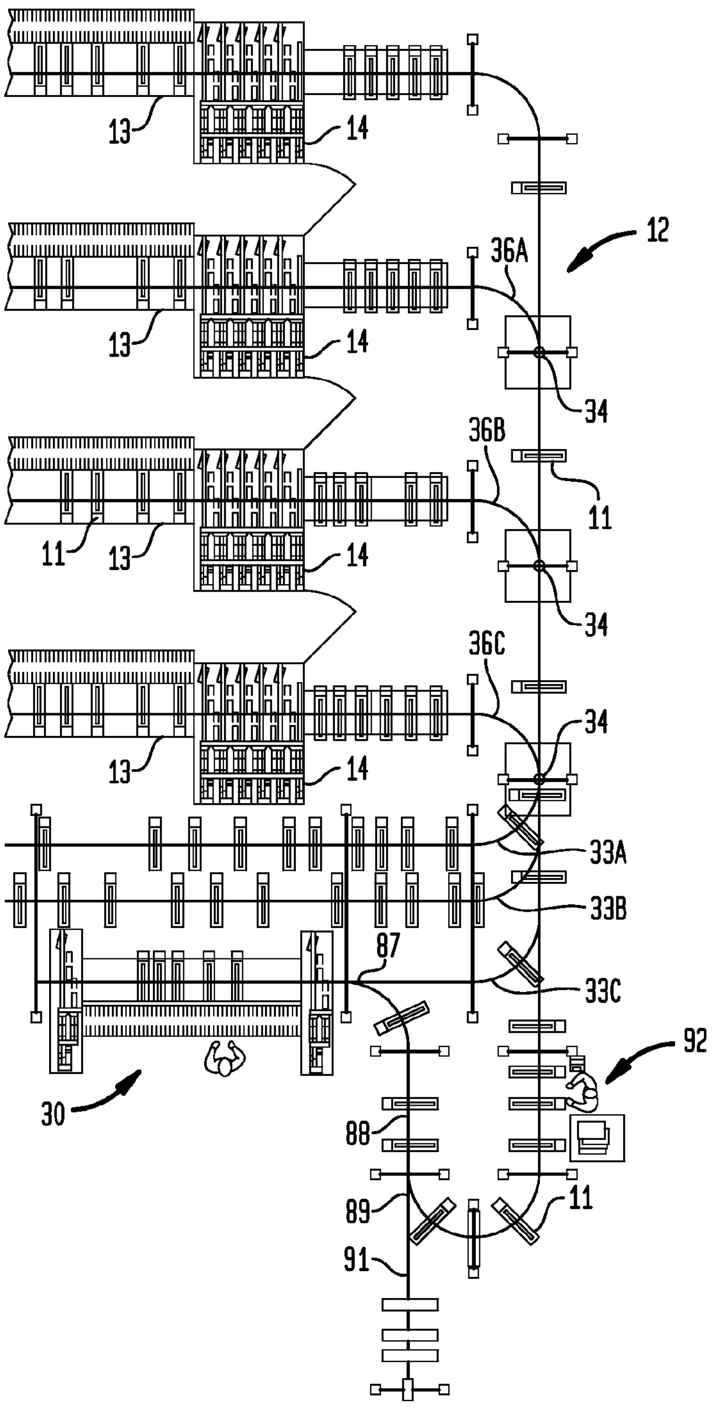
FIG. 4 is an enlarged view of the switching section of the system shown in FIG. 2.

FIGS. 2-4 illustrate such a system in more detail. An important aspect of the invention is the intelligent handling of exceptions at the feeding section 21. In this example, a first feeding station 22 includes an automatic feeder 23 of known type including a pick-off mechanism which removes mail pieces stacked on edge one at a time from one end of the stack in a manner known in the art. Station 22 also includes an ECR feeder 25 which feeds pieces to an OCR module 24 in the same manner as feeder 22. OCR module 24 reads the address information in order to determine the destination slot the robot 11 will deliver the mail to. In addition, it is preferred that OCR module 24 measure other characteristics of the mail piece as well, such as its dimensions (width and height), thickness, and weight. A second feeding station 26 includes an automatic feeder 23 and a manual feeder 27 wherein mail pieces may be hand fed into the OCR module 24.

The control system then applies predetermined criteria for the system to determine if the mail piece can be sorted by a robot 11. As a result of this analysis, each mail piece is classified by the control system into one of several categories:

(1) normal mail that is within the predetermined normal size range for robot transport, with a resolvable address;

(2) oversize or overweight mail that can't be auto-loaded into a robot, but can be hand fed into a robot;

(3) exception mail which is transportable by a robot;

(4) double feeds, misfeeds, oversize and overweight mail that cannot be transported by a robot, and accountable/certified mail. Normally mail in the first group is fed into a robot 11 by a loading and indexing system 28 for transport either to an office mail tub 79 (FIG. 9) used along a bottom row of a tower 12 in place of a pod 18 where a large number of mail pieces are expected for a recipient, or one of the standard pockets 15 of a pod 18. Mail in the second group is transported by inserter robots 11 to either an office mail tub 79, an optional vertical dispenser described in connection with FIG. 23 below, an exception handling case 30, or possibly a standard pocket 15 of a pod 18, depending on whether the address information on the mail piece was readable or not. Mail in the third group represents exception mail that cannot be sorted because the address information was unreadable, out-of-scheme, or requires forwarding as a result of a forwarding order placed by the recipient. Mail in the fourth group includes misfeeds of all kinds where the mail needs to be removed and fed through again, as well as mail requiring special handling that should not be machine sorted, such as certified mail. Mail in this group is diverted to a reject chute 31 and falls into a bin 32 for manual handling by the human operator, which will in the case of misfeeds amount to taking the mail pieces to the manual feeding station 27 and trying again.

Each of feeding stations 22, 26 has an associated parallel track 33A, 33B on which robots 11 are presented to it for loading. Tracks 33A, 33B and a recirculation track 33C are at different heights (FIG. 1) and conduct robots 11 to a first switch 34. Switch 34 is effectively three switches spaced vertically, one each for tracks 33A-C.

As discussed in the '065 application, a robot 11 when loaded will be provided with instructions concerning which switches to actuate in order to reach its assigned destination. In the embodiment of system 10 shown, there are a total of four cases or towers 13 each mounting horizontal rows of pods 18 on different levels. A robot 11 passing by the first switch 34 will send a signal to the switch instructing it to permit the robot 11 to move ahead along its track 33, or divert towards the first tower 13 along a first side track 36.

Figure 5:
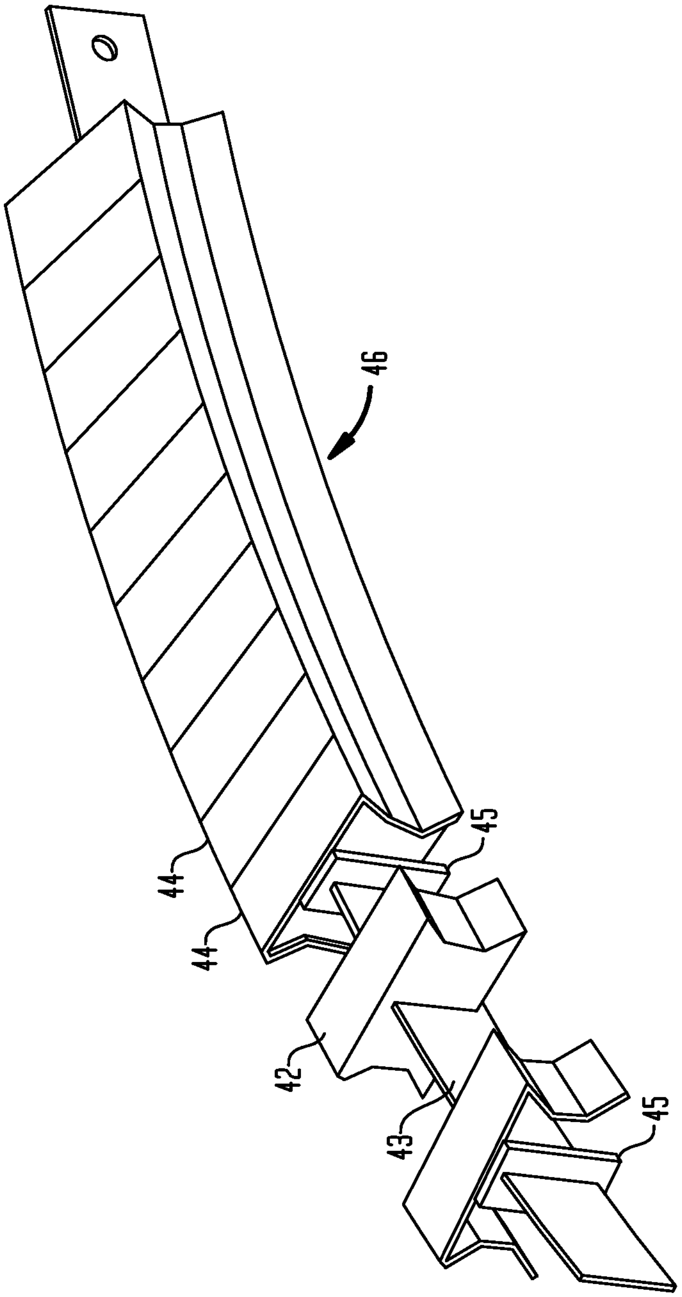
FIG. 5 is a partially exploded view of a switchable rail according to the invention.
Figure 6:
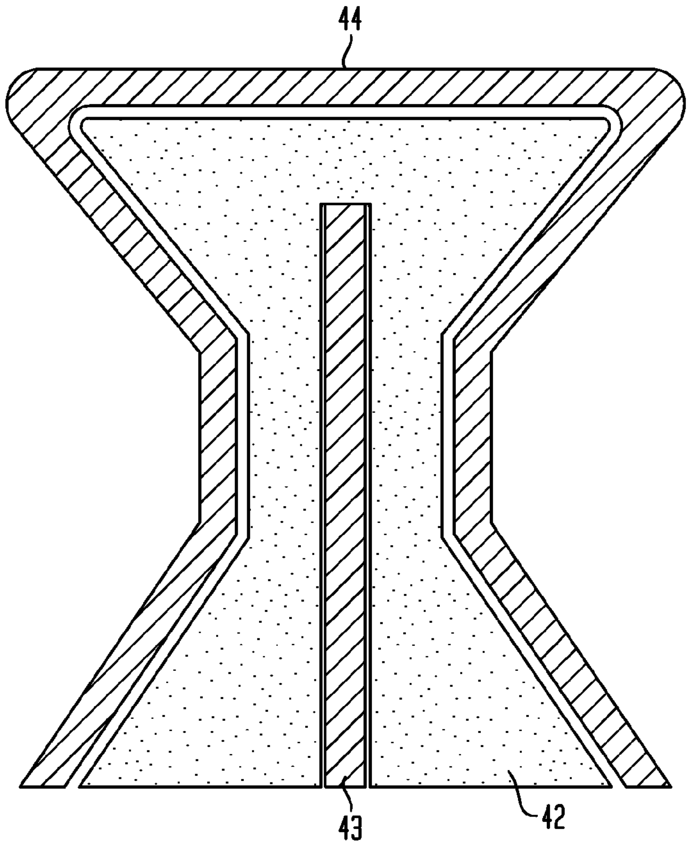
FIG. 6 is a cross sectional view of the rail shown in FIG. 5.
Figure 7:
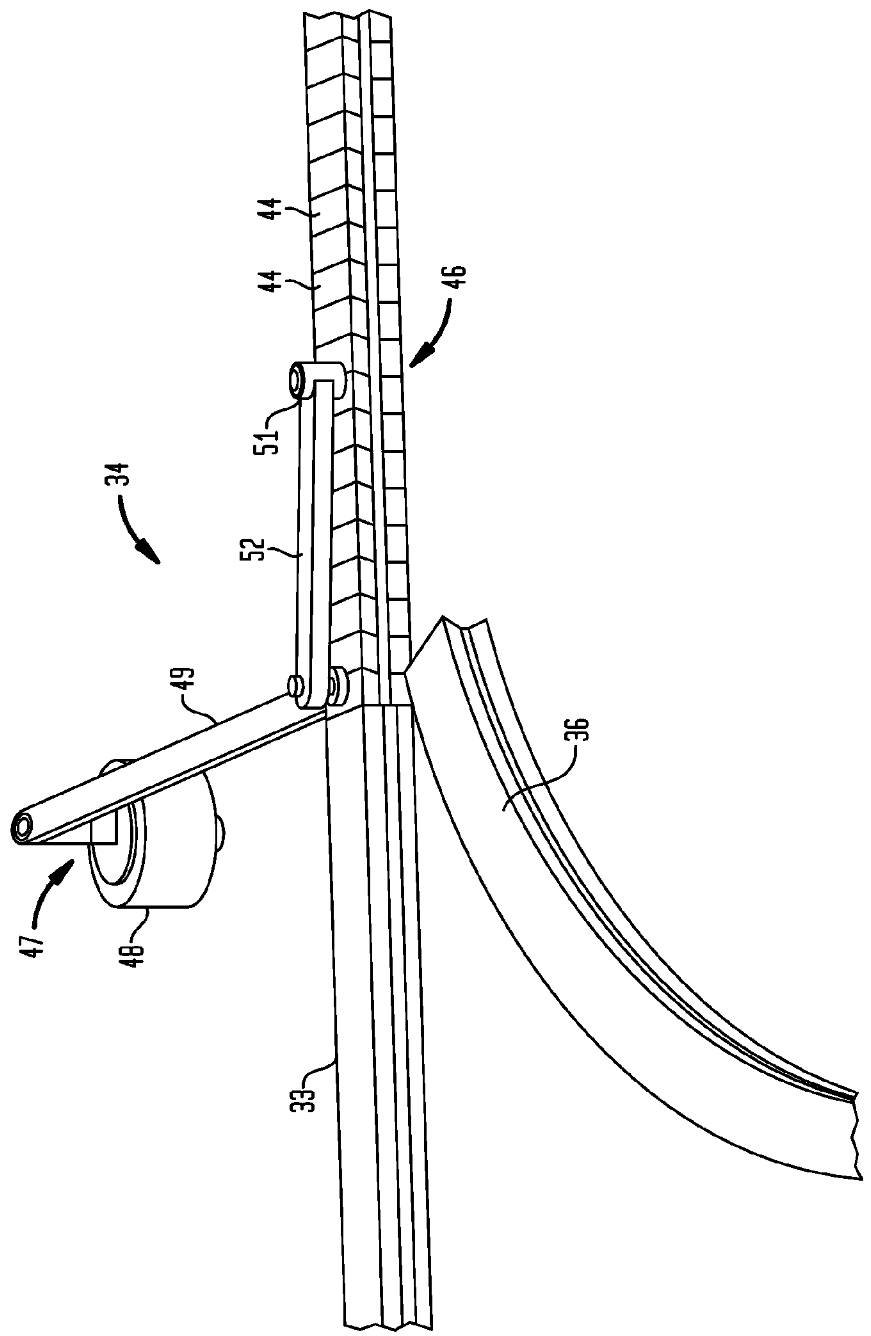
FIG. 7 is a perspective view of a switchable rail according to the invention.

Switches 34 may be of any known type effective for switching a monorail. However, it is preferred that switches 34 have extremely high durability and make minimal noise, since the system will be deployed indoors, and each switch 34 will be cycling frequently as self-propelled robots 11 pass by. For this purpose, a preferred switch mechanism 34 is shown in FIGS. 5 to 7. Each switch 34 comprises a series of resilient, hourglass-shaped cores 42 formed from an extruded or molded elastomer such as polyurethane, a flat, resilient steel spine 43, and a series of hourglass-shaped covers 44 formed from a metal such as a steel alloy. Cores 42 have a central vertical slot by which they are mounted over and covering spine 43. Covers 44 fit closely over the outsides of cores 42. Covers 44 may have an end flange 45 on one side thereof designed to protect the outside lateral surface of the segment during operation. It is contemplated that, in some applications, covers 44 may be omitted and replaced by a single continuous core formed from a plastic material having sufficient mechanical strength and wear resistance to support robots 11 during operation.

Covers 44 and cores 42 are stacked side by side along the length of spine 43, forming a segmented movable track segment 46. In a straight undistorted position, segment 46 forms part of one of tracks 33 and permits a robot 11 moving thereon to continue moving in a straight line along the indentations on opposite sides of the track. Where the robot 11 signals that it should be diverted to one of the towers 13, segment 46 is bent from its undistorted position by an actuator 47 so that it aligns with the associated side track 36. In this example, actuator 47 includes a reversible electric motor 48 which drives a rotary crank 49 connected to the moving end of segment 46, as well as to an upright pivot 51 located on a centrally located cover 44 by means of a connecting rod 52. While, as illustrated, actuator 47 uses an electric motor, it is contemplated that a hydraulic cylinder, solenoid, pneumatic cylinder or similar device may be employed as the actuator.

A robot 11 diverted to a side track 36 by a switch 34 at any of the three vertical levels A, B or C is conducted to the corresponding divert elevator 14 of the tower 13. In a similar fashion, robots 11 continuing on tracks 33A-C may be diverted by the second or third switches 34 to side tracks 36 leading to the second or third towers 13. Robots 11 not so diverted continue on along one of tracks 33A-C to the last elevator 14 associated with the fourth tower 13.

Divert elevator 14 receives instructions from robots 11 entering it and transports them to the designated level within the tower 13. Elevator 14 receives robots 11 at three different heights corresponding to tracks 33A-C and transports them to a greater number of possible levels, such as twelve in FIG. 1. However, in a simplified system where the number of vertical tracks 36 A-C matches the number of rows per tower, the entry elevator 14 would not need to perform this function. Side tracks 36 may effectively merge with three of the twelve tower levels, so in some cases a robot 11 can move thru elevator 14 without being raised or lowered.

Figure 8:
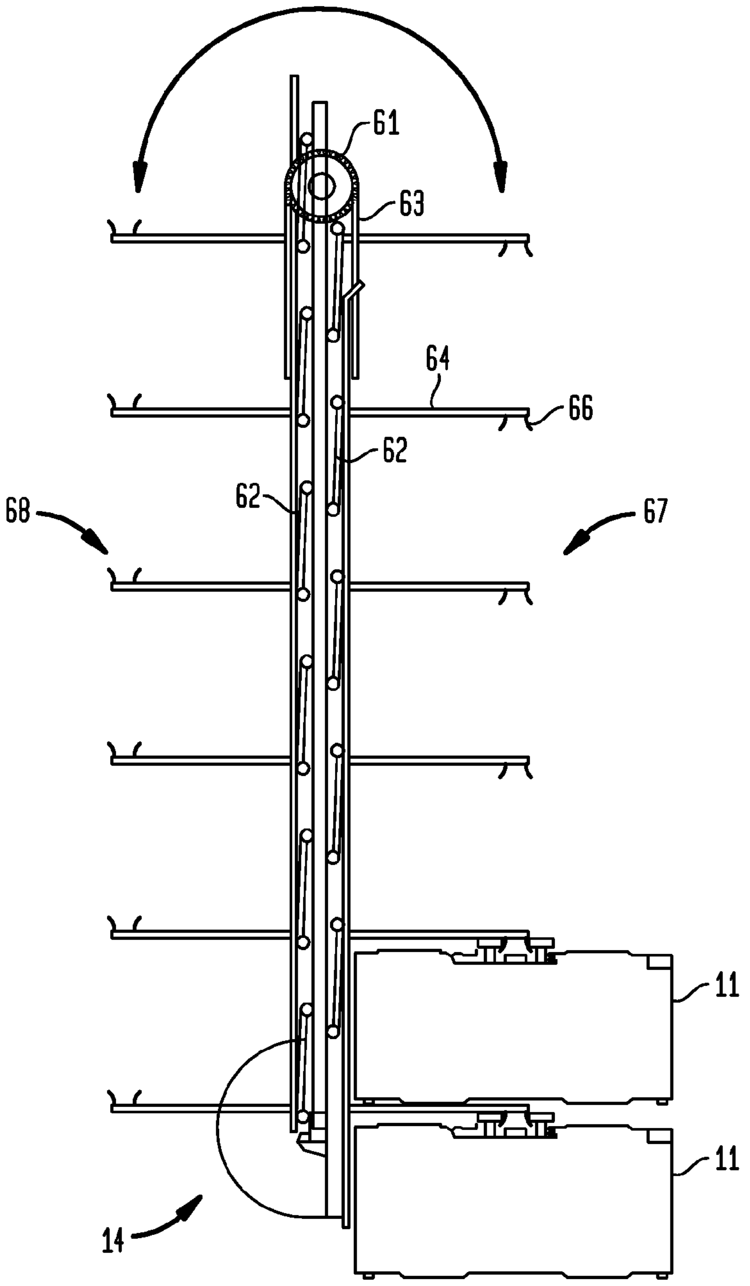
FIG. 8 is a side view of an elevator used in the system of the invention.

Referring to FIG. 8, elevator 14 may comprise a central vertical conveyor 61 having a series of L-brackets 62 pivotally mounted to a drive chain 63 thereof at spacings corresponding to the separation of levels on case 13 and the spacing of side tracks 36. An outward arm 64 of each bracket 62 has a rail 66 forming a movable track section secured thereto for receiving a robot 11 thereon from one of side tracks 36A-C. Transport of robots 11 between levels occurs on the operative side 67 of the elevator. Brackets 62 passing the top level are pivoted to an opposite orientation on the return side 68 of the elevator 14 and are cycled back to the operative side 67 in either direction as needed. Upon receiving a signal from a robot 11 indicating the level to transport the ANT to, vertical conveyor 61 operates with robot 11 engaged to one of rails 66 and raises or lowers the robot 11 to the indicated level. Upon reaching the destination level, the robot 11 detects that it has reached the correct level (as by scanning a coded marker) and drives off of elevator 14 onto tower 13.

Elevator 14 should have sufficient width to transport not only one or more robots 11 on a single rail 66, but also the POD barges 96 described hereafter, which are of larger size. Multiple robots 11 may be loaded onto elevator 14 at the same time on different levels using a suitable control scheme. For this purpose, it may be useful to give elevator 14 a wider range of positions than the tower it is associated with, so that it can if necessary carry one or more robots 11 temporarily beyond the top or bottom level of tower 13 in the course of bring each robot to the correct level.

Figure 9:
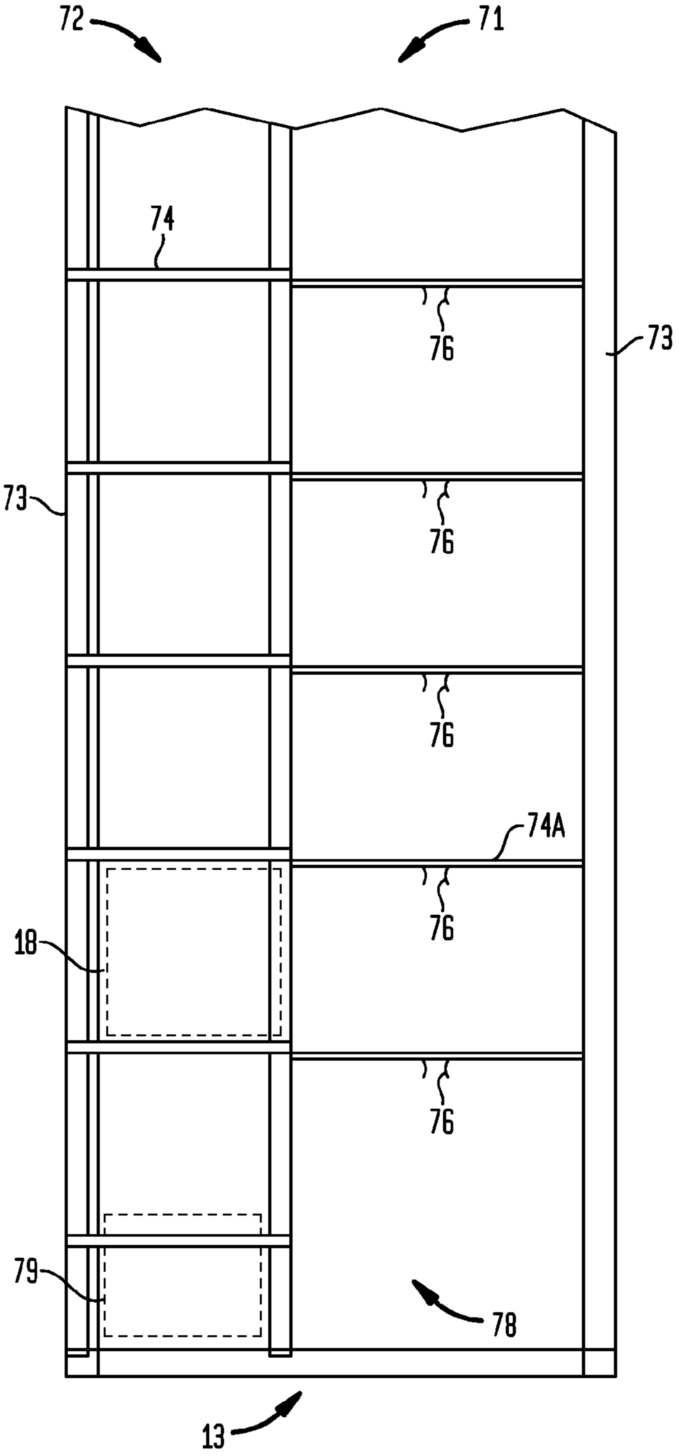
FIG. 9 is a partial side view of a tower used in the system of the invention, with pods removed.
Figure 10:
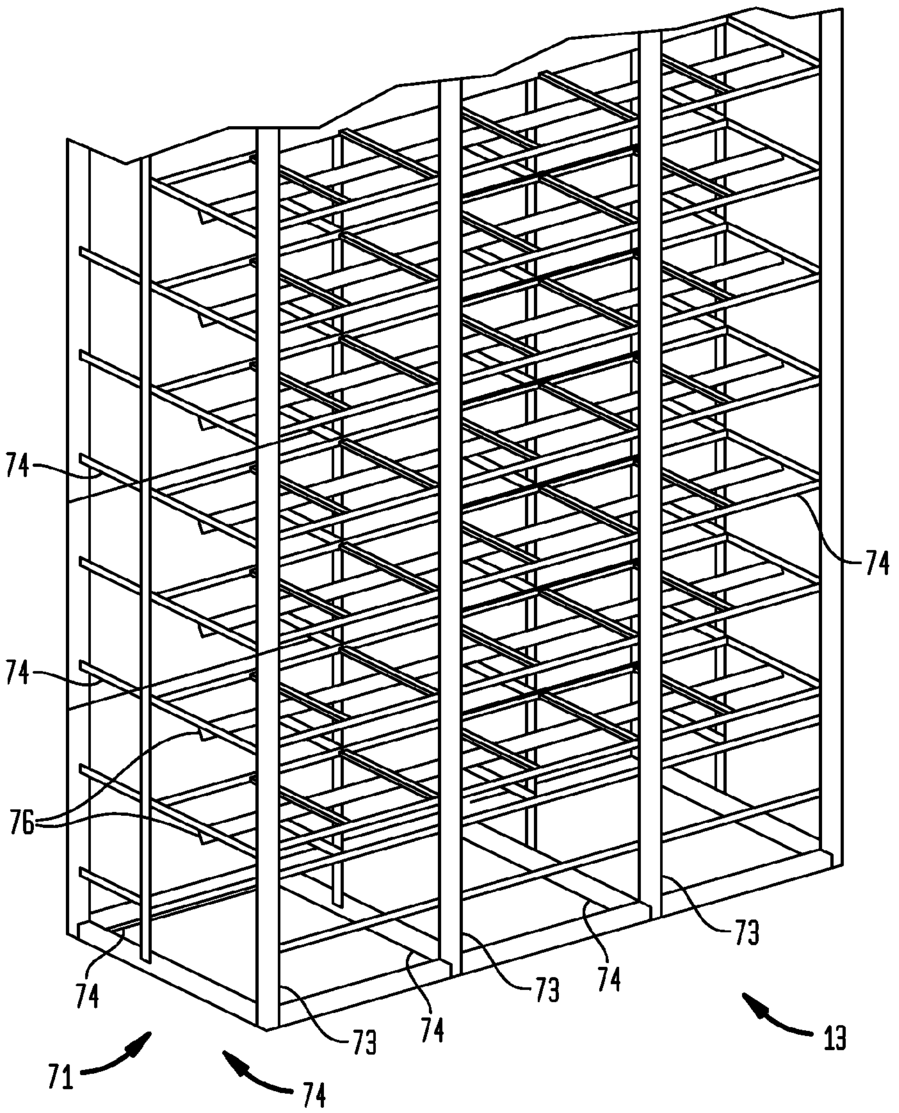
FIG. 10 is a perspective view of the tower of FIG. 9.
Figure 11A:
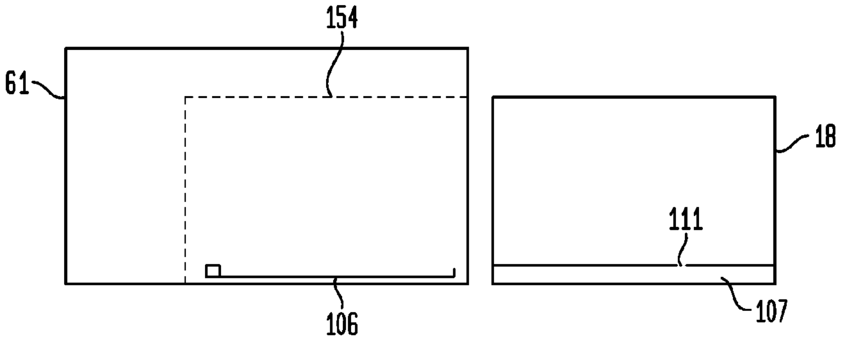
FIGS. 11A-11D are a series of schematic side views of a pod being loaded into a pod barge according to the invention.
Figure 11B:
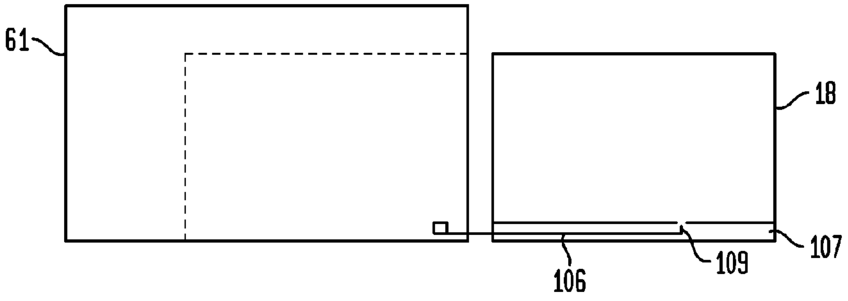
Figure 11C:
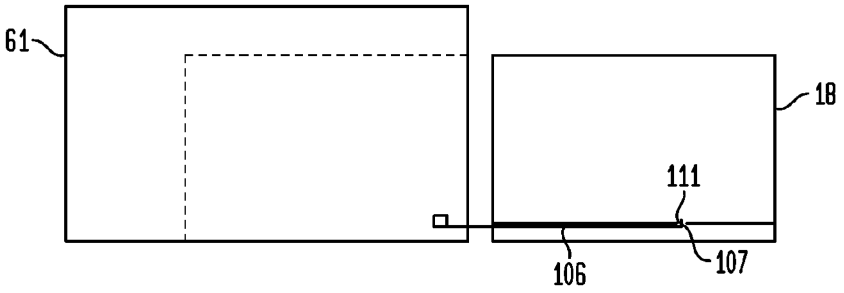
Figure 11D:
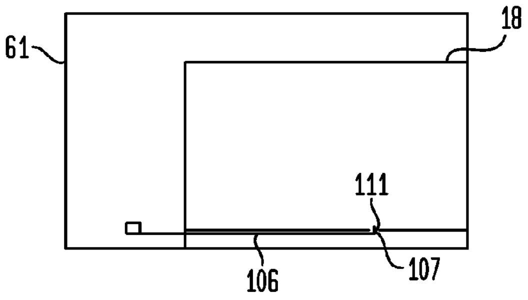
Figure 12:
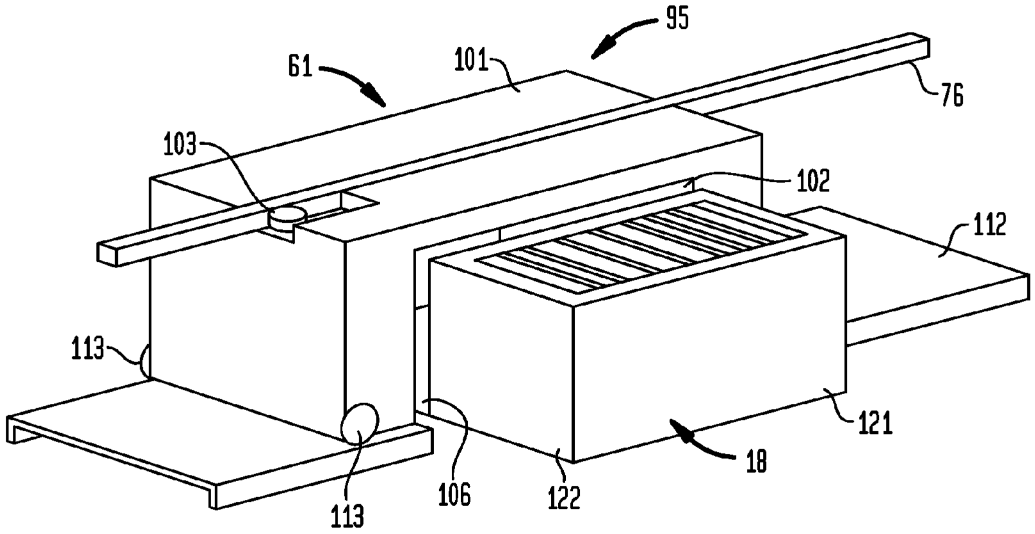
FIG. 12 is a perspective view of a pod barge engaging a pod according to the invention, with the tower omitted.

Referring to FIGS. 9 and 10, tower 13 which receives robot 11 has an outer section 71 through which robots 11 pass and an inner section 72 in which pods 18 are mounted during sorting. Both sections are formed by vertical and horizontal beams 73, 74 which form a multilevel, rectangular frame structure. Rails 76 supported on crossbeams 74A extend the length of outer section 71 at levels corresponding to each tier of pods 18. Robots 11 move along rails 76 to deliver a mail piece to a specific pocket 15 located in each pod 18. Inner section 72 is configured so that pods 18 will fit therein side by side on each tier, with the open loading side facing outer section 71 for access by robots 11. Tower 13 can be made from a series of modular sections that can be secured side by side according to the total number of pockets needed in the system. The bottommost tier 78 may be enlarged so that postal tubs 79 can be positioned therein for manual removal after a sorting run.

While passing along rails 76, robots 11 must find a specific pocket 15 in a specific pod 18 before stopping to insert the mail piece into that pocket 15. Each pocket 15 bears a tag 75 scannable by robot 11 so that a robot 11 moving along rail 76 can determine its destination in several steps. First, the robot is instructed based on a virtual pod and pocket assignment scheme wherein only relative positions are specified. For example, for purposes of the sorting run, the specific destination address (e.g., 1313 Mockingbird Lane) is assigned during sort scheme generation to tower 13-A, tier 3, 8th pod from the entry side, 10th pocket in the 8th pod. To reach this slot, robot 11 is instructed by the control system how to signal the switches 34 and elevator 14 as needed to reach the third tier of first tower 13. Robot 11 then uses the encoder provided as part of its drive motor to measure the distance it travels along rail 76, until it has traversed a sufficient distance to reach the designated pod 18. At that point, robot 11 slows down and starts to scan for the tag 75 of the specific pocket 15 it is to deliver a mail piece to, and stops when that pocket 15 is detected. These features enhance the speed and throughput of the system as compared to using robots 11 which must scan every tag 75 they pass by before detecting the pocket designated. The cycle by which a robot 11 delivers its mail piece into the pocket of the pod 18 is described in the '065 application.

It should be noted that pods 18 are physically interchangeable, and tags 75 are marked with an unique identification code only, not an actual destination address or encoded form of an address. During sort scheme generation, the control computer builds a table which associates each ID code for each tag 75 and its position on one of towers 13 with a destination address.

Once robot 11 has delivered its mail piece, it continues moving along rail 76 until it exits tower 13 and enters an exit or merge elevator 16. Merge elevator 16 can be similar or identical to divert elevator 14, but may operate in a manner effective to allow several empty robots 11 to enter the elevator at the same level and transport all of them at the same time to the exit level. This may be accomplished by a combination of basic control functions on the robots and elevator 16. For example, robots 11 are provided with proximity detectors and are programmed to stop and wait when they encounter an obstacle on the track ahead, such as another robot 11. The first robot to enter moves to the end of elevator rail 66 and stops due to a scan that tells it that it is not on the exit level. Subsequent robots 11 coming in behind the first one also stop, waiting for the first one. When rail 66 is full of robots, an event which may be detected by a sensor which is part of the elevator 16 at the entry side of each level, elevator 16 operates to move all of the robots 11 to the exit level. The lead robot 11 scans the tag at that location and drives on, opening the way for the other robots 11 to do likewise until all have left the elevator 16. Elevator 16 is then ready to transport another set of robots from another level in a similar manner.

Robots 11 leaving elevator 16 move along one of four exit rails 81 which merge back into tracks 33A-C. Empty robots will normally be programmed to return to either of tracks 33A or 33B for reloading. However, if an error occurs or if the control system needs to place a robot 11 in a holding pattern, and a robot 11 exits a tower 13 without discharging its mail piece, then that robot 11 will activate elevator 16 in a manner effective to bring it to recirculation track 33C. Each of the towers 13 and the associated tracks and elevators operate in the same manner, except that the outermost tower 13 sends robots 11 destined for recirculation track 33C to an optional extension track 82. Extension 82 passes in a serpentine manner over extraction section 19 and then merges into track 33C.

A recharging zone 86 is provided along a length of each of tracks 33A-33C. Each robot 11 is self-propelled by means of an on-board battery, or preferably by an ultra capacitor lighter weight than a battery, or a battery/ultracapacitor combination in a manner known in the art. Rails of each of tracks 33A-33C are electrified in recharging zone 86 so that robots 11 recharge while moving through this zone. Details of robots 11 are provided in commonly owned, co-pending U.S. Ser. No. 10/879,298, filed Jun. 29, 2004, entitled SYSTEM AND APPARATUS FOR DRIVING A TRACK MOUNTED ROBOT (now U.S. Pat. No. 7,481,728), the contents of which are incorporated by reference herein for all purposes.

Robots 11 on recirculation track 33C exiting recharging zone 86 first pass by exception mail case 30. As discussed above, some mail sorted at feeding stations 22, 26 will be address-scanned and identified as unsortable, either out of scheme or in need of forwarding. Robots 11 carrying these mail pieces will be moved from track 33A or 33B to track 33C by one of the elevators 14, 16 and brought around to case 30. Case 30 is divided into pockets as appropriate to group the types of exception mail encountered, for example, assigning pockets to specific out of scheme zip codes and mail to be forwarded. Case 30 may use the case structure shown in the '065 application using a removable guide frame that is positioned in the case during sorting, and can then be pulled out leaving the mail in groups as sorted. Case 30 is manually unloaded by a postal operator as needed.

Recirculation track 33C then passes by a first side track switch 87 (FIG. 4) which may be similar to one of switches 34. When actuated by the robot 11, switch 87 causes the ANT to enter a side track loop 88, after which the ANT encounters a second side track switch 89. A robot 11 in need of maintenance or repair will signal to operate both of switches 87, 89 and be diverted to a maintenance lane 91 where it will be serviced and eventually returned to track 33C when ready, or removed from the system. A robot 11 which is empty will signal to activate first switch 87 but not second switch 89, thereby continuing along loop 88 past a manual loading station 92. At station 92, a human worker scans incoming mail too large or small to feed automatically into a robot 11 and then manually loads it into each robot 11. Once loaded, robots 11 merge back into track 33C as shown in FIG. 4.

Recirculation track 33C thus serves as a lane for robots 11 which for a variety of reasons are not ready to be reloaded with a mail piece by one of feeding stations 22, 26. In the case of a robot which missed its intended delivery pocket, such a robot can go around again along track 33C, then take an elevator 14 to the desired level and try again to deliver the mail piece. Similarly, a robot 11 holding a piece of exception mail will move from one of tracks 33A or 33B to track 33C before reaching exception mail case 30. After delivering its mail piece to station 30, the empty robot 11 will then go around again, this time moving to one of tracks 33A or 33B at one of elevators 16, and then back to one of feeding stations 22, 26.

Once all mail pieces for a run have been sorted, robots 11 collect on tracks 33A, 33B in recharging zone 86. An automated conveying system 95 then transports the groups of sorted mail to the delivery point packaging machine 200. Such a conveying system includes a number of pod barges 96 which are activated and move onto tracks 33A-33C from a pod barge storage rack 97. Pod barges 96 are similar to robots 11 in a number of respects. Each barge 96 an onboard controller which receives instructions from the control computer telling it how to navigate to reach the target pod 18 by actuating the switches and elevators. Each pod barge 96 has a drive system similar to that of a robot 11 but of greater capacity, and a larger number of ultracapacitors, consistent with the loads barges 96 are expected to carry.

Referring to FIGS. 11A-11D and 12, each barge 61 comprises a rectangular housing 101 having a centrally located side opening 102 sized to receive a pod 18 therein. A drive wheel 103 engages rail 76 and the other tracks of the system. Suitable means are provided for permitting the barge 61, upon reaching the target pod 18, to engage it, remove it from the tower 13, and securely carry it to the area where it will be unloaded. This is done, for example, using a pair of forks or arms 106 which extend from the barge 61 to enter slots 107 in the lower corners of pod 18, then elevate to lift pod 18 slightly off of the framework of tower 13 on which it rests, and then retract to draw pod 18 entirely into opening 102. The process of unloading the empty pod 18 after extracting its mail would be the reverse of these steps. Forks 106 may have upturned or angled ends 109 for mechanically engaging corresponding internal grooves or holes 111 in pod 18 to secure pod 18 inside barge 61.

Optionally, for greater security during loading and unloading, outer sections 71 of towers 13 can be provided with a floor or shelf 112 at the bottom of each tier, and housing 101 can be provided with sets of wheels 113 at its corners for rollingly engaging shelf 112 during loading and unloading.

Figure 13:
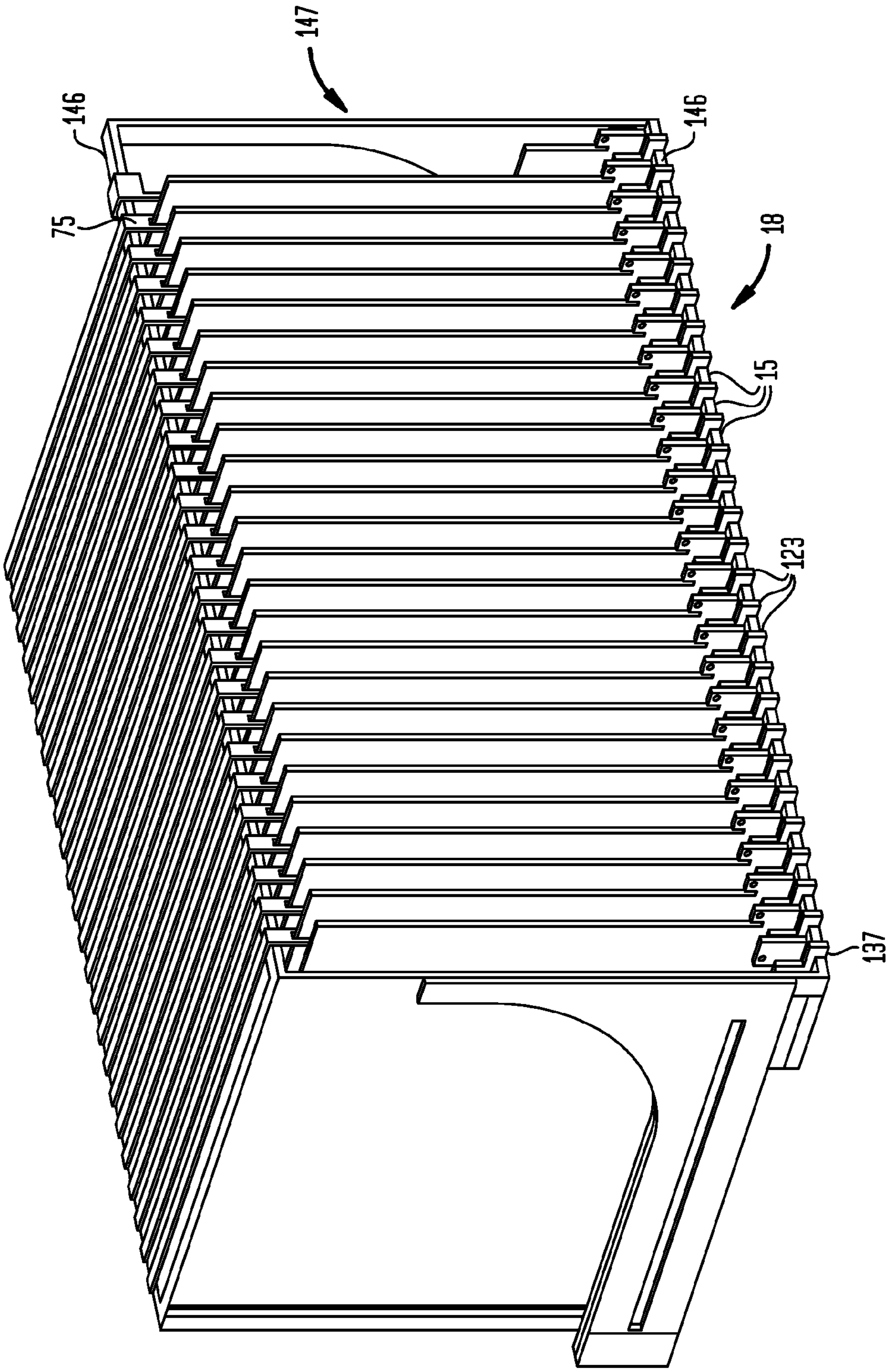
FIG. 13 is a front perspective view of a pod according to the invention with the housing removed.
Figure 14:
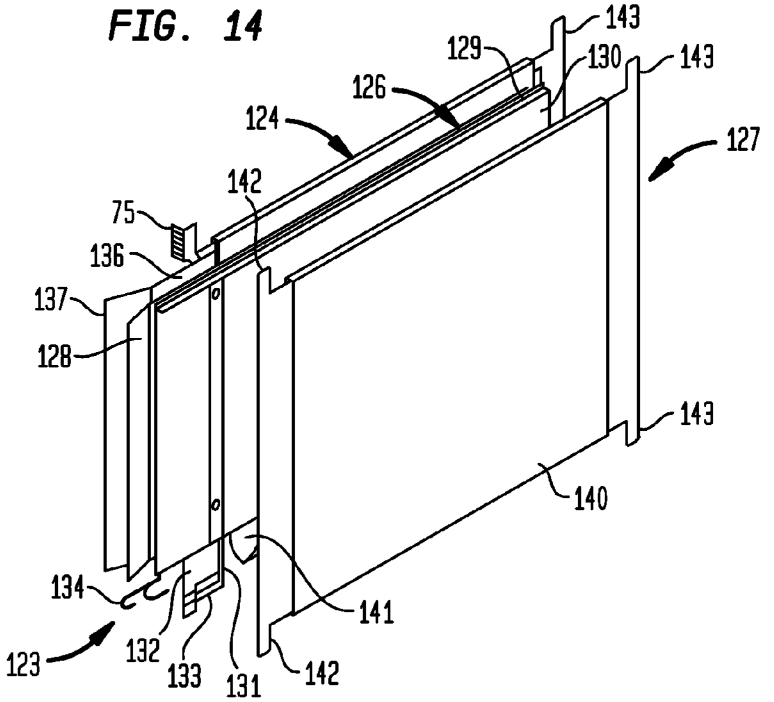
FIG. 14 is a perspective view of a pocket structure according to the invention.
Figure 15:
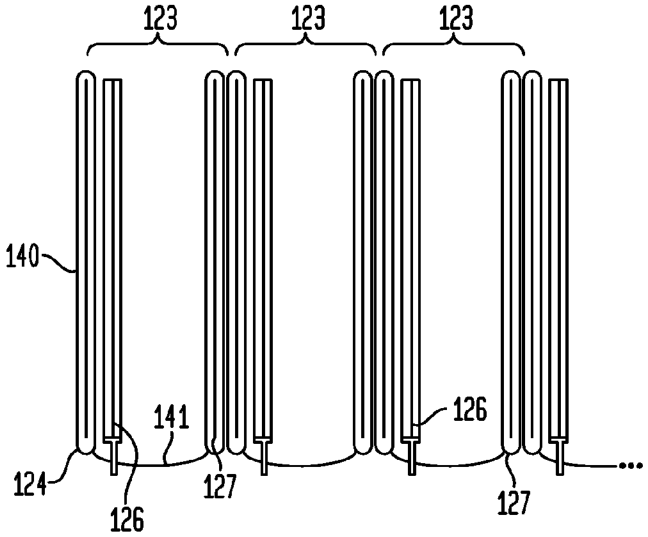
FIG. 15 is a front schematic diagram of a series of pocket structures according to the invention.

Pods 18 preferably have a structure that permits loading from the front and unloading from the top, although other arrangements are possible, such as both loading and unloading from the front. Referring to FIGS. 13-15, each pod 18 has a rectangular housing 121 covered on the sides by cover panels 122, leaving at least the top and front open. A series of pocket assemblies 123 are mounted side-by-side. Each assembly 123 interacts with the inserter robots 11 in the manner described in the '065 application, except as noted herein.

Since bags are not mounted in the pockets 15, there is no need for a separate guide frame in front of each case as described in the '065 application, and the pocket assemblies 123 may therefore be mounted in the pods 18 as shown. A pocket assembly 123 includes a left side wall 124, a slip sheet assembly 126, and a right side wall 127. The inserter mechanism of the robot 11 extends between left side wall 124 and slip sheet assembly 126 in order to insert a mail piece. Slip sheet assembly 126 includes a low friction slip sheet 128 having an outer cover plate 129 secured thereto, which cover plate has a sliding belt 130 thereon to cancel motion relative to mail already in the slot when the slip sheet assembly 126 is withdrawn by the insertion mechanism of the robot 11.

Unlike in the '065 application, belt 130 is mounted on an L-shaped post 131 which is secured to an extension 132 from the lower edge of left wall 124. The horizontal portion 133 of post 131 is configured to act as a leaf spring, biasing assembly 126 towards wall 124. After insertion of the mail piece between plate wall and assembly 126, robot 11 engages a hook 134 of slip sheet assembly 126 and withdraws it. Post 131, being secured to the left pocket wall, remains in position and causes belt 130 to slide over the surface of plate 129. The leaf spring effect then causes slip sheet assembly 126 to move to the left, past the inserter mechanism to the position comparable to FIG. 14E in the '065 application, whereon the inserter mechanism can withdraw leave the mail piece behind and the pocket 123 back it its initial position to receive the next mail piece.

Left and right pocket walls 124, 127 are configured similarly, although left wall 124 preferably has a bent flexible steel flange 136 that allows its flared edge 137 to return to its original position following compression during the insertion cycle. An ejection H-belt 140 is mounted on each of walls 124, 137 and has a web portion 141 that normally forms the bottom of the pocket 123 as shown in FIG. 15. During extraction, upon withdrawal of sheet assembly 126 using hook 134, web 141 can be pushed from below as described hereafter, ejecting mail from the pocket 123 through the open top side of the pod 18. Walls 124, 127 are preferably mounted by means of front and rear posts 142, 143 to corresponding grooved cross beams 146 forming part of the pod frame 147. In this way, each pair of walls 124, 127 and the associated H-belt 140 can slide sideways but are permanently mounted to pod 18.

Once the single pass mail sort is complete, pod barges 96 enter the rail system 33A-33B from the pod storage rack 97 and remove pods 18 one at a time for unloading (extraction). For this purpose, once a pod 18 has been removed and secured inside barge 96, the barge moves via the elevators 16 to one of several extraction stations 150 adjacent to elevators 16, generally one for each tower 13 and elevator 16. As shown in FIGS. 1 and 16A-16C, pod barges 96 enter extraction station 150 along a rail 151 that adjoins the lowest level of elevator 16 and are lifted by an elevator 152 to the next level up. Elevator 152 may be similar to elevators 14, 16, but with a single movable rail that cycles between its top and bottom positions. Barges 96 drive off of elevator 152 at the upper level onto a rail 153 on the same level as the second lowest level of elevator 16. This permits the empty barges to re-enter the rail system to either pick up another pod or return to storage rack 97.

Figure 16A:
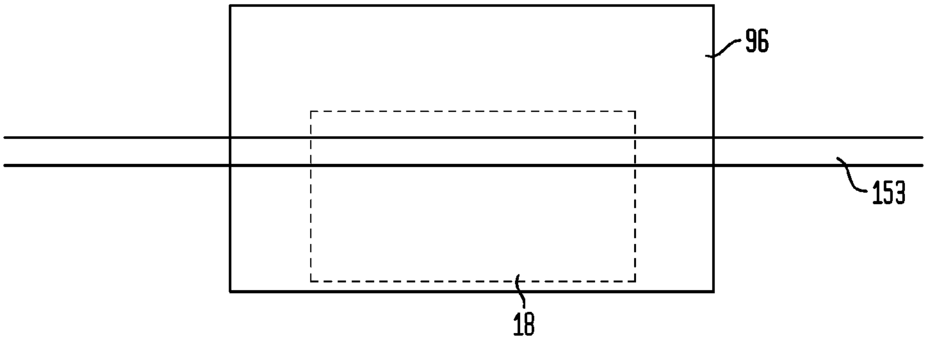
FIGS. 16A-16C are a series of schematic top views of a pod extraction sequence according to the invention.
Figure 16B:
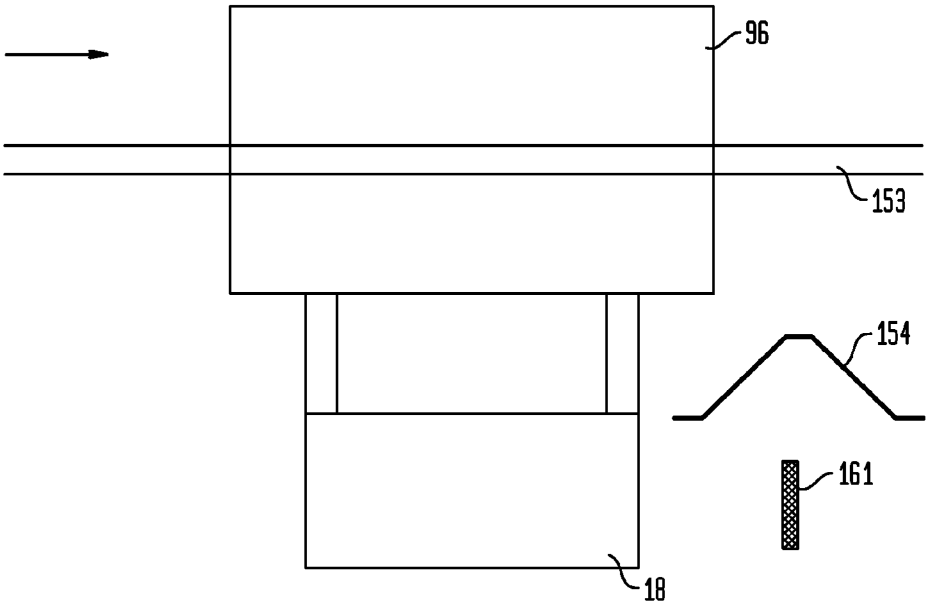
Figure 16C:
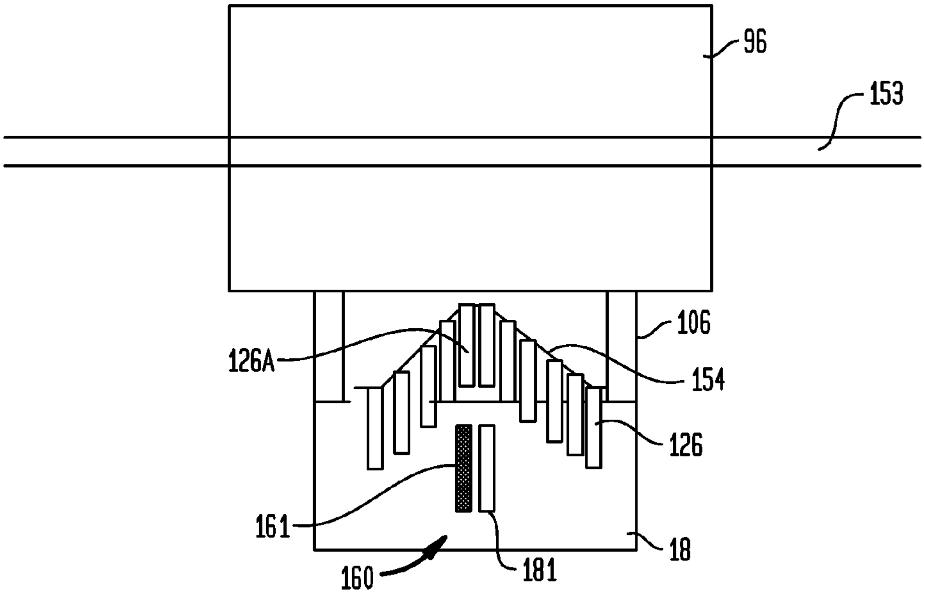

Unloading station 150 includes an extraction mechanism effective to pull out the slip sheets 126, one at a time or all at once, so that the H-belt 140 of each pocket 123 can be actuated from below. In the embodiment of FIGS. 16A-16C, arms 106 of barge 96 are activated to extend pod 18 out of barge 96 to the position shown. Barge 96 moves the row of hooks 134 into engagement with the end of a V-shaped rail 154. As pod 18 is carried along rail 152 by the movement of pod barge 96, slip sheets 126 are pulled out progressively, with the sheet 126A at the apex of the V-shaped rail 154 in a fully retracted position. Slip sheets 126 that have progressed past the apex of the V-shaped rail 154 are pushed back into the pockets again as they continue to follow rail 154.

The apex of rail 154 coincides with an ejection mechanism 160 disposed beneath pod 18. Ejection mechanism 160 includes a plunger or pusher 161 with a rectangular upper face that matches the dimensions of web 141 in the pocket 123 presently at that position. Ejection mechanism 160 may be actuated by a solenoid or pneumatic cylinder. Pusher 161 causes the mail in pocket 123 to move upwardly out of pod 18. Edge registration of the bottoms and front edges of the mail pieces is preserved by the action of H-belt 140.

Figure 17:
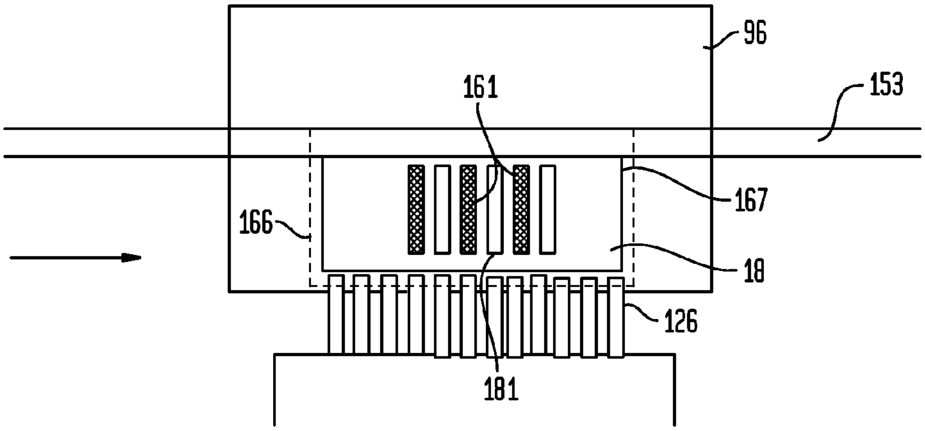
FIG. 17 is a top view of an alternative pod extraction method according to the invention.

FIG. 17 represents an alternative to the construction of FIGS. 16A-16C. In this embodiment, barge 96 has a rectangular opening 166 that coincides with the open top of pod 18. Barge 96 is large enough that opening 166 lies to one side of the rail 153 on which barge 96 travels. A U-shaped pulling bar 167 engages hooks 134 and is used to pull out, then push back in all of the slip sheets 126. Ejection mechanism 160 is positioned beneath barge 96 and pod 18 to act on each pocket 123 as it passes over.

A multiple ejection cycle is possible with this embodiment wherein several pockets are ejected at a time by several ejectors 160 spaced so that every Nth pocket (N=2, 3 or 4, for example) is ejected at the same time. This greatly shortens the time required to extract the mail from the pod. In the discussion below, where multiple ejectors are provided, the transfer mechanism and wrapping system are duplicated for each ejector 160 and operate simultaneously.

Figure 18:
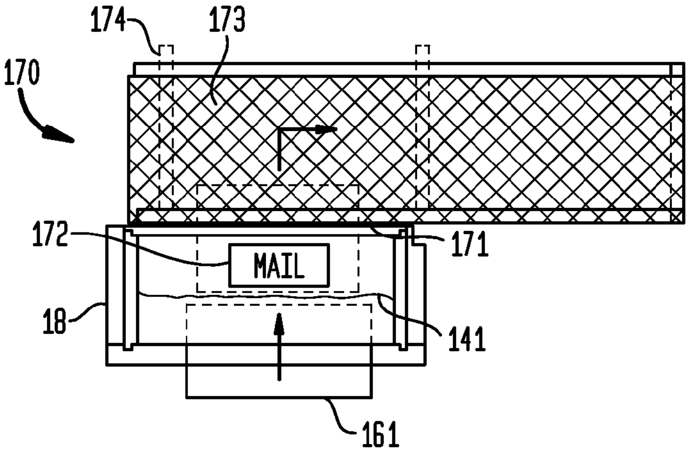
FIG. 18 is a partial side view of mail extraction from a pocket according to the invention.
Figure 19:
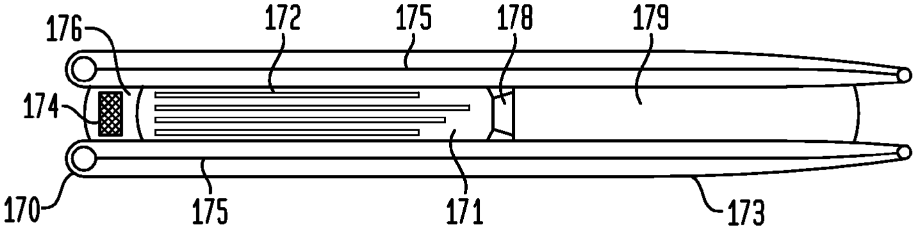
FIG. 19 is a top view of a right angle transfer mechanism that receives mail extracted from the POD in FIG. 18.

Referring to FIGS. 18-19, when web 141 has reached the top of the pocket 123, the mail therein has been moved through the open top of pod 18 upwardly inside of a right angle transfer mechanism 170. Mechanism 170 has a housing with a bottom opening 171 at one end through which mail 172 passes when ejected from pod 18. Right angle transfer mechanism 170 also has an H-belt 173 mounted on its side panels 175 for horizontal movement. The drive post 174 of H-belt mechanism 173 is actuated to move the web 176 of H-belt 173 to the right in FIGS. 18 and 19, moving from the left hand to a middle position M. The mail 172, still supported from below by the ejector 161 and web 141 of the pod pocket, slides to the right side of right angle transfer mechanism 170, up an angled slide 178 and onto a horizontal bottom 179 that supports mail 172. The H-belt 140 of the pod pocket 123 can then be returned to its normal loading position, such as by an offset pusher 181 similar to pusher 161 but above and acting in the opposite direction (see FIGS. 16C, 17). Alternatively, pusher (s) 161 may be provided with means such as suction through vacuum holes for engaging web 141 and pulling it back to its starting position.

Right angle transfer mechanism 170 is further actuated to load mail 172 as required into a delivery point packaging machine 200. Drive post 174 is moved further to the right, ejecting all of the mail into the loading zone of the packaging machine 200. Right angle transfer mechanism 170 has a length sufficient to clear other nearby components of the system and carry the mail to machine 200. Once post 174 reaches its rightmost position, mail 172 has been fully ejected, and post 174 is returned to its starting position on the left as shown in FIG. 18. Post 174 may be actuated by any conventional means, such as by a motor-driven belt.

Packaging machine 200 is preferably configured to accept mail 172 in a vertical orientation so that edge registration of the mail pieces created during sorting can be maintained, making the mail easier to package and handle. Commonly-owned Pippin et al. U.S. patent application Ser. No. 11/128,494, filed May 13, 2005 (now U.S. Pat. No. 7,426,996), the entire contents of which are incorporated by reference herein, describes a delivery point package for mail in the form of a folder that partially encloses the mail and has a pair of releasable contact adhesive stripes that allow the sides of the folder to cling to the outermost mail pieces on either side. Packaging machine 200 applies such a package to mail that has been sorted using the system of the present invention.

Figure 20:
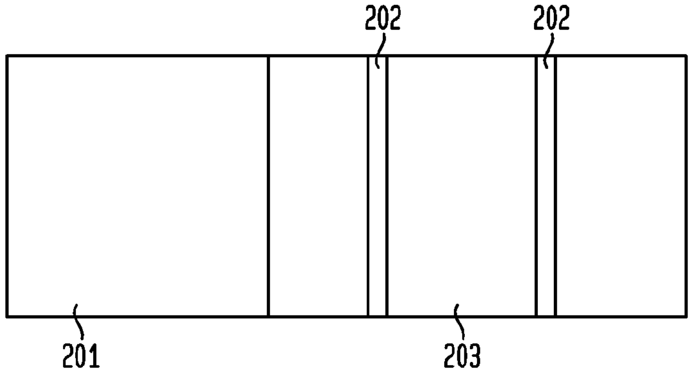
FIG. 20 is a side view a first embodiment of a roll of packaging material according to the invention.
Figure 21:
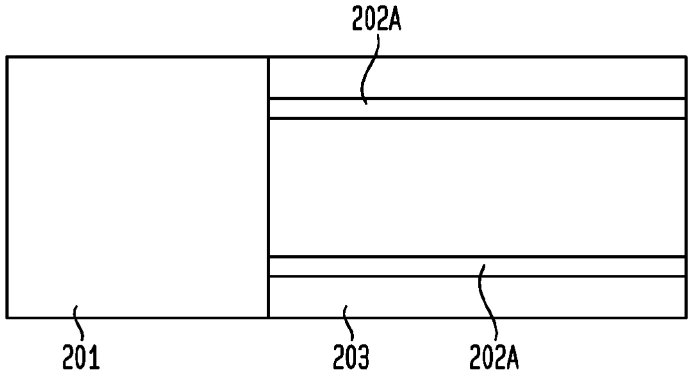
FIG. 21 is a side view a second embodiment of a roll of packaging material according to the invention.

FIG. 20 illustrates a roll 201 of sheet material of the type described in the '494 application, wherein one or more weakly adhesive, regularly spaced, widthwise stripes 202 have formed on the inside face of the sheet 203. In this configuration, machine 200 must cycle precisely so that stripes 202 are applied at the same position to each set of mail pieces. In the alternative embodiment of FIG. 21, stripes 202A are instead oriented lengthwise, eliminating the need to precisely align the sheet with the mail, but potentially making the package more difficult to remove from the mail.

Figure 22:
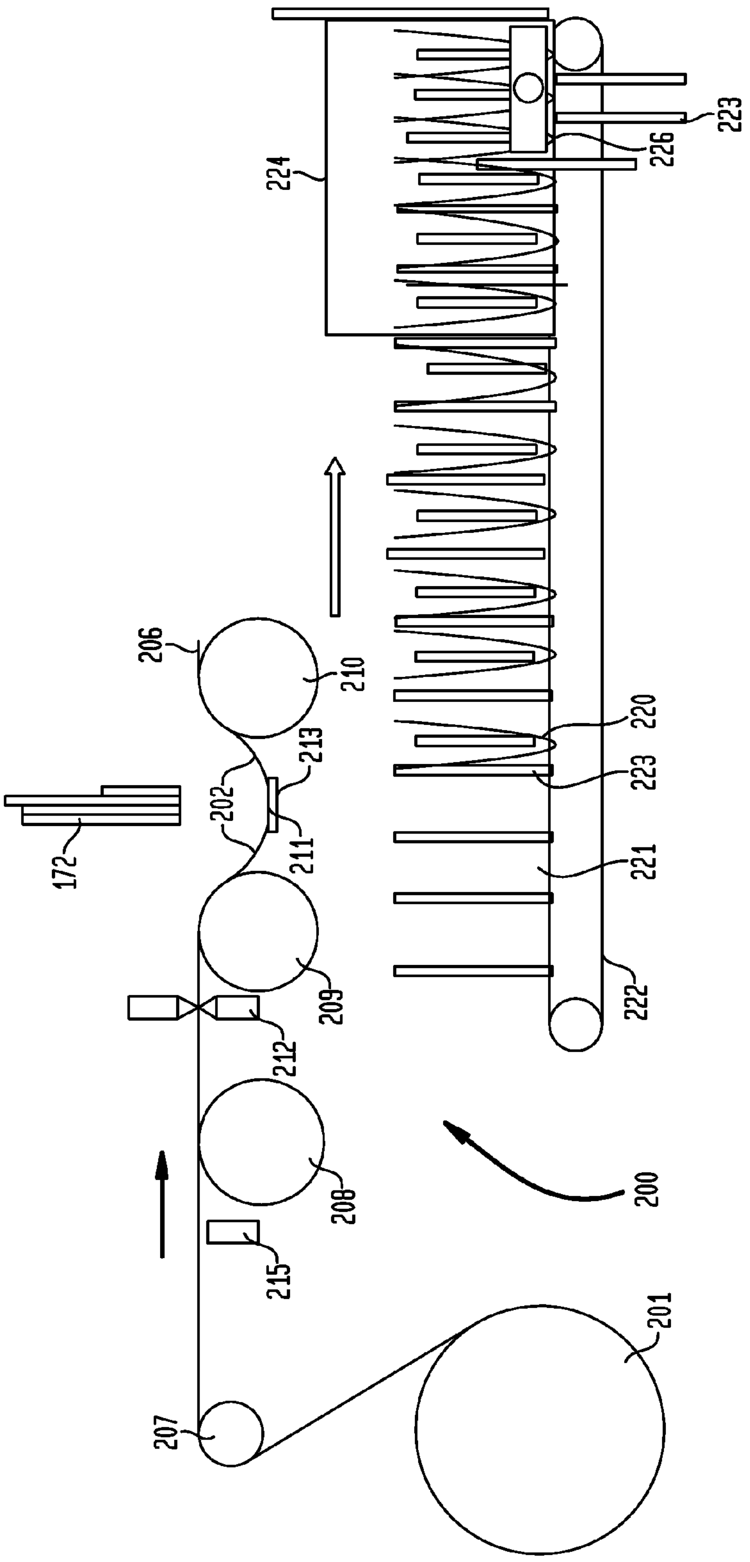
FIG. 22 is a schematic side view of a delivery point packaging system according to the invention.

Referring to FIG. 22, roll 201 is mounted for rotation at one end of machine 200. Its free end 206 is wound over a series of rollers including an idler roller 207 and a series of three spaced vacuum rollers 208, 209, 210. Rollers 208-210 may be fashioned as hollow steel drums wherein the outer circumferential surface of each has small holes distributed thereon. A source of negative pressure is connected to the interior of each roller 208-210, resulting in suction through the holes. This suction holds the outer face of free end 206 against each roller and permits rollers 208-210 to drive free end 206 and unwind roll 201 as needed. When the leading edge of free end 206 is at the desired position, e.g. at roller 209, a printer 215 is activated to print recipient information and carrier alerts as described in the '494 application cited above. This procedure is repeated each time a new package is made. The computer controlling the system keeps track of the recipient of each batch of mail delivered for packaging and provides printer 215 with the corresponding address and delivery data.

Advertising information may be printed by printer 215, or may be preprinted on the sheet at the same time as adhesive stripes 202 are formed. Such advertising created at the same time as the bundle 220 using printer 215 can be created at that moment the control computer knows the individual recipient for that bundle 220. The control computer could therefore match a previously received request for advertising from an advertiser mailing list with the named recipient. In the alternative, the ad to be printed could be selected based on a demographic profile of the recipient or the recipient's neighborhood or region for goods or services most likely to be of interest to the recipient. The control computer could, in the case of multiple advertisers with overlapping mailing lists, follow a schedule in which different ads would be presented to a given recipient each day mail is delivered. The schedule could be open-ended (first come first serve) or cyclic (e.g., the named recipient gets an ad from a specified advertiser once per unit of time, such as once per week or once per month.) Advertising revenue resulting from this aspect of the invention can be used to offset the cost of the packaging material and process.

Before receiving mail 172 for packaging, rollers 208, 209 are driven for a short time while roller 210 is stationary, forming a downward bulge or well 211. Rollers 208-210 may be driven by rotary electric motors engaging the axle of each roller, or any other conventional drive roll systems. Stripes 202 face upwardly and are preferably equidistant from the centerline of well 211. The depth of well 211 corresponds to the desired size of the resulting package and how much of the sides of the mail piece bundle will be covered. A cutter 212 positioned between rollers 208, 209 then severs free end 206 of the sheet 203. Optionally, a support platform 213 is brought into position at the bottom of well 211, as by automated horizontal extension.

With machine 200 in this position, transfer mechanism 170 delivers a batch of mail 172 into well 211. Depending on the stiffness of the sheet material and the weight of the mail, this may cause further slight downward movement of well 211 such that rod 213 supports part of the weight of the mail 172. With the mail in position, rod 213 (if present) is withdrawn, and rollers 209 and 210 are driven in opposite directions to bring adhesive stripes 202 into contact with the sides of the mail 172. One or both of rollers 209, 210 may be mounted for lateral movement towards one another to aid in this process, and away to their former positions once the sheet is completely applied to the mail. The resulting bundle 220 then drops into a compartment 221 on a segmented belt conveyor 222. Conveyor 222 has a series of spaced vertical walls 223 forming the compartments 221, which walls 223 can be withdrawn below the level of conveyor 222 when necessary in a manner known in the art. Roller 208 is then driven to extend the free end 206 of roll 201 over rollers 209, 210 in preparation for the next packaging cycle.

Conveyor 222 cycles bundles 220 towards a loading zone. A mail container such as a tub 224 is positioned with its opening facing sideways and one of its sidewalls on the same level as conveyor 222. Walls 223 are withdrawn and a pusher 226 is actuated to slide one or more bundles 220 off conveyor 222 and into tub 224 in a sideways position that is advantageous for mail handling once the tub 224 is brought upright. Tub 224 can be loaded all at once or progressively, a set of bundles 220 at a time, as illustrated. Once filled with mail, tub 224 is ready for use by a mail carrier in distributing the mail to its final destination.

Other types of packaging systems can be used in the invention. For example, a commercially available polywrap machine can be used to seal bundles of mail removed from the pods inside of bags. Such systems, however, have the disadvantage of requiring a large amount of additional packaging material as compared to the folder made from a single sheet as described above. The process of the invention could also be used without packaging, e.g. by stacking each batch of mail side by side, optionally with use of divider cards to differentiate mail for one address from mail for the next. Such divider cards could be placed manually, or sorted using the robots after all sorting of mail has been completed but before the pod barges begin the unloading process.

One of the persistent problems in preparing mail for delivery has been the need of the mail carrier to coordinate pulling mail from several presorted sets in order to make a delivery. Oversize mail that cannot be sorted using the single pass sorting system described herein will have to be reunited with the packaged mail bound for the same destination at some point prior to delivery. There will invariably be oversize or overweight mail such as catalogs too large or too heavy to successfully insert into a pocket, but which could be loaded into a robot 11, either automatically or by hand at the manual feeding station 92.

Figure 23:
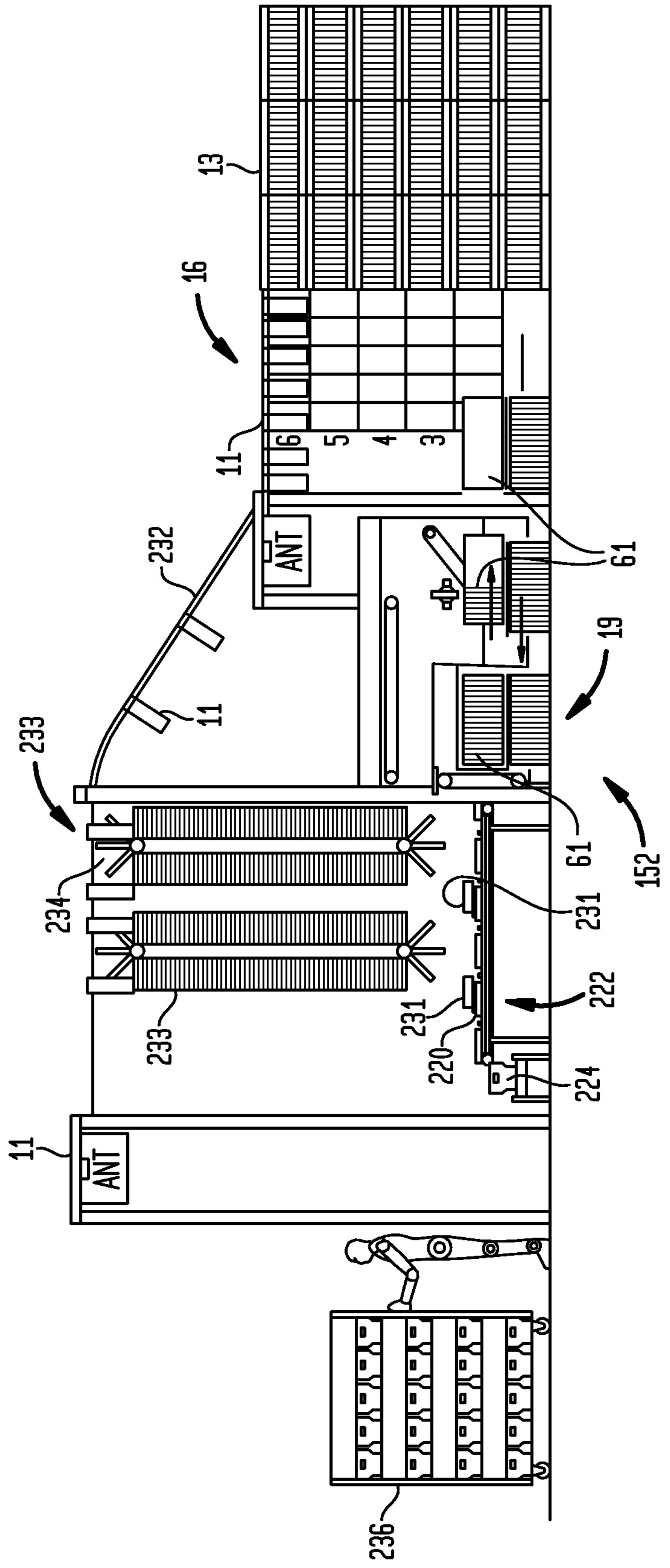
FIG. 23 is a schematic side view of an optional system for sorting oversized or overweight mail pieces according to the invention.

According to an alternative embodiment of the invention shown in FIG. 23, such oversize or overweight mail 231 is loaded into a robot 11 and carried to an additional side track 232 which may for example be part of recirculation loop 33C. Track 232 takes robots 11 containing oversize or overweight mail 231 to the top of one or more vertical conveyor dispensers 233. Such a carousel is described in Pippin U.S. Pat. No. 5,141,129, Aug. 25, 1992, the contents of which are incorporated herein by reference.

Robot 11 unloads its oversize or overweight mail piece onto a cell 234 of the vertical dispenser 233 in position to receive it, and dispenser 233 is cycled to present the next open cell 234 for the next robot 11 to arrive. The master control computer tracks the recipient of mail pieces in each cell 234. It may be possible, depending on the details of the vertical dispenser design, to have robots deposit more than one mail piece into a cell 234 if all of the mail pieces are intended for the same recipient. During the pod unloading and packaging part of the process, divider walls 223 are omitted and bundles 220 are deposited on conveyor 222 and allowed to fall over to a horizontal position. Conveyor 220 thereby carries a series of bundles 220 thereon with spacing between them.

As each bundle 220 passes beneath one of the vertical dispensers 233, the control computer checks to see if any oversize or overweight mail is to be delivered to that recipient. If so, the dispenser 233 is actuated to move the compartment containing that mail piece into position and deposit the oversize or overweight mail 231 directly onto bundle 220. The resulting stack of mail is then loaded into a postal tub 224 either automatically or by a postal worker who also moves full tubs 224 onto a cart 236. This eliminates the corresponding step wherein the mail carrier looks through a stack of presorted mail to find the one he or she needs, and then looks through a stack of oversize mail to find the oversize mail for the same recipient, if any.

As noted above, the system of the invention is suitable for use in a process of single pass mail sorting with delivery point packaging as a subsequent step. In such a process, the incoming mail has been presorted so that all or nearly all mail pieces in the batch are addressed to recipients in a common postal delivery zone. The zone may, for example, be a 5-digit zip code or a subdivision within a 5-digit zip code. The automated single pass mail sorting system 10 uses robots 11 to sort the batch of mail pieces into groups wherein the mail pieces in each group have a common delivery destination. In the illustrated embodiment, each group is sorted to one or more pockets associated by the computerized control system with an assigned delivery destination. Once the sorting pass is complete, the groups of mail are transported by the automated conveying system 95 to the delivery point packaging machine 200. A single destination may receive two or more mail bundles 220, if the number of mail pieces for that destination required two or more pocket assignments.

The groups of mail are preferably brought to the delivery point packaging machine in carrier delivery order. Since an entire pod is unloaded at a time, within each pod, pockets are assigned so that the mail will be removed in carrier delivery order depending on the pocket removal scheme. If one pocket is unloaded at a time, then the pocket destinations can be assigned sequentially (1, 2, 3, 4, . . . 20). If more than one pocket is unloaded at a time, then pocket destinations are assigned based on order of removal. For example, if every fourth pocket is removed at the same time and there are 20 pockets in the row, then the pocket order would be (1, 6, 11, 16, 2, 7, 12, 17 . . . , 5, 10, 15, 20.)

In development of the computerized sort scheme for use with the invention, the possible destinations for mail will be known in advance, but the number of mail pieces in the batch for each destination will generally not be known. Some destinations may receive no mail at all, whereas others may receive more mail than will fit into a single pocket. To some extent, past mail volume history can be used to plan for this. Destinations that historically receive a large volume of mail may be assigned a bottom row tub 79 as described above, rather than a pocket. However, unless the destinations for incoming mail are fully known in advance, it is necessary that some pockets remain unassigned and as such the number of available pockets exceeds the total number of sorting destinations. During sorting, when a pocket becomes full, the system may assign an additional pocket to that destination and begin transporting further mail to that destination to the new, overflow pocket. In this manner variations in mail volumes can be accommodated. However, the overflow pockets will not be part of the carrier delivery sequence present for the majority of pods and pockets. As such, the invention preferably involves a further step of manually uniting additional mail bundles 220 with the first mail bundle 230 for that destination. On the other hand, if the composition of the incoming batch of mail is fully known in advance, then the computer can determine the number of pockets required and ensure that all of the bundles will be unloaded in carrier delivery order.

Although the pockets in each pod are assigned according to a sequence as discussed above, pods 18 may be brought for unloading in any desired order. As such, pod assignments may be randomized in a way that evens out traffic of robots 11 on the rail system. If State Street is known to receive a large volume of mail as compared to other streets in that zone, for example, and the pods for that street were all placed in order on the same row of the same tower, then a backup of robots 11 trying to enter that row would develop and slow the overall performance of the system. To prevent this from happening, the bins for State Street are assigned to different rows and towers so that robot traffic is as uniform as possible across the rail system. Upon completion of sorting, when destinations on State Street are to be unloaded, the associated pods 18 are removed from the various rows and towers and presented to the packaging system in the proper order.

System 10 preferably has suitable means for determining when use of an overflow pocket will be needed. This may be done by methods known in the art for determining the thickness of each mail piece as it is being imaged in OCR module 24. The control system keeps track of the cumulative thickness total for all mail pieces delivered to each slot. When a slot's limit has been reached, this causes the control system to assign an overflow pocket and transport all additional mail for that destination to that pocket. This is more effective than determining whether a pocket is full by mechanical or electronic means before a decision is made that an overflow pocket be assigned.

The control system or control computer according to the invention may be as described in the foregoing Pippin et al. U.S. patent application 20030038065 (now U.S. Pat. No. 7,138,596). Such control system may comprise a single master computer or a number of computers working in a coordinated fashion so that control of the system is distributed rather than centralized.

While this invention has been described with reference to illustrative embodiments, this description is not intended to be construed in a limiting sense. Various modifications and combinations of the illustrative embodiments will be apparent to persons skilled in the art upon reference to the description. Such variations and additions are specifically contemplated to be with the scope of the invention. It is intended that the appended claims encompass any such modifications or embodiments.

The invention claimed is:

1. A method of mail sorting, comprising:

sorting a batch of flat mail pieces addressed to recipients in a common postal delivery zone with an automated single pass mail sorting machine into groups wherein the flat mail pieces in each group have a common delivery destination, wherein individual flat mail pieces are each transported and inserted into one of a series of slots each containing one group of flat mail pieces;

removing the groups of flat mail pieces from their respective slots using an automated removal system;

transporting the groups of sorted mail using an automated conveying system to a delivery point packaging machine; then packaging the groups of mail pieces with the delivery point packaging machine, wherein the step of transporting the groups of sorted mail using an automated conveying system comprises extracting groups of mail pieces from slots into slots of transport barges, whereby groups of mail are kept separate from each other, transporting the barges from the slots to an unloading station, automatically unloading the barges by automatically removing groups of flat mail pieces from the barge slots at the packaging machine, and feeding the groups of mail pieces into the packaging machine.

2. The method of claim 1, further comprising packaging the groups of flat mail pieces with the packaging machine by lowering a group of flat mail pieces endwise into the packaging machine and wrapping a plastic film about the lowered group of flat mail pieces.

3. The method of claim 1, wherein the groups of mail pieces fed into the packaging machine in carrier delivery order.

4. The method of claim 1, wherein the packaging machine includes a roll of a packaging sheet material mounted for rotation about its lengthwise axis;

a pair of vacuum rollers rotatably mounted side by side in spaced apart, parallel positions such that a free end of the sheet on the roll may be unwound and extend over a perforate circumferential surface each of the vacuum rollers;

a drive system that drives at least one of the vacuum rollers towards the other in a manner effective to form an upwardly facing well in a free end of the sheet held to respective perforate circumferential surfaces of each of the vacuum rollers, wherein the vacuum rollers are spaced sufficiently far apart so that a group of flat items can be deposited on the well from above; and a cutter positioned between the roll and the vacuum rollers to sever a free end portion of the sheet.

5. The method of claim 4, wherein the packaging machine also includes a support positioned beneath the well configured to support the weight of the group of flat items in the well.

6. The method of claim 1, wherein the packaged group of mail pieces is dropped as a bundle into an upwardly opening compartment formed by a series of spaced vertical divider walls secured to and extending upwardly from a horizontal conveyor beneath the packaging machine.

7. A method for sorting flat mail, comprising:

(a) loading a flat mail piece to be sorted into an insertion mechanism of a delivery robot;

(b) determining for the flat mail piece a destination slot the mail piece is to be delivered to, which slot is in a pod in a case, each pod having a plurality of slots wherein each slot corresponds to a delivery destination for mail, the destination slot associated with a specific pod;

(c) moving the delivery robot along a rail disposed at the front of the case near the slots into proximity with the specific pod by measuring movement of the robot along the rail, traveling a predetermined distance to the specific pod according to the measured movement, and locating an open end of the destination slot using a machine-readable tag associated with the destination slot, wherein the robot is self-propelled and can move along the rail from one slot to another;

(d) automatically inserting the flat mail piece from the delivery robot into the associated slot using an insertion mechanism of the robot; and (e) returning the delivery robot to a loading station whereby steps (a)-(d) may be repeated until sorting is completed;

(f) then automatically unloading the mail pieces from the slots;

(g) transporting each group of mail using a transport mechanism to a packaging machine; and (h) separately packaging each batch of mail pieces removed from the slots using the packaging machine.

8. The method of claim 7, wherein packaging the batches of flat mail pieces with the packaging machine is performed by lowering a group of flat mail pieces endwise into the packaging machine and wrapping a plastic film about the lowered group of flat mail pieces.

9. The method of claim 7, wherein the batches of mail pieces transported to the packaging machine in carrier delivery order.

10. The method of claim 7, wherein the rail is mounted adjacent a horizontal row of upright slots that receive flat mail pieces from the delivery robot through an open front side thereof, and the insertion mechanism that enters a slot and inserts a flat mail piece into one of the slots.

11. The method of claim 7, wherein the packaging machine includes a roll of a packaging sheet material mounted for rotation about its lengthwise axis;

a pair of vacuum rollers rotatably mounted side by side in spaced apart, parallel positions such that a free end of the sheet on the roll may be unwound and extend over a perforate circumferential surface each of the vacuum rollers;

a drive system that drives at least one of the vacuum rollers towards the other in a manner effective to form an upwardly facing well in a free end of the sheet held to respective perforate circumferential surfaces of each of the vacuum rollers, wherein the vacuum rollers are spaced sufficiently far apart so that a group of flat items can be deposited on the well from above; and a cutter positioned between the roll and the vacuum rollers to sever a free end portion of the sheet.

12. The method of claim 7, wherein the packaging machine also includes a support positioned beneath the well configured to support the weight of the group of flat items in the well.

13. The method of claim 7, wherein the packaged batch of mail pieces is dropped as a bundle into an upwardly opening compartment formed by a series of spaced vertical divider walls secured to and extending upwardly from a horizontal conveyor beneath the packaging machine.

* * * * *